US009231853B2

United States Patent
Zisapel et al.

(10) Patent No.: US 9,231,853 B2
(45) Date of Patent: *Jan. 5, 2016

(54) LOAD BALANCING

(71) Applicant: RADWARE LTD., Tel Aviv (IL)

(72) Inventors: Roy Zisapel, Tel Aviv (IL); Amir Peles, New York, NY (US); Smadar Fuks, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 2 days.

This patent is subject to a terminal disclaimer.

(21) Appl. No.: 14/333,005

(22) Filed: Jul. 16, 2014

(65) Prior Publication Data

US 2014/0330983 A1 Nov. 6, 2014

Related U.S. Application Data

(60) Continuation of application No. 13/935,683, filed on Jul. 5, 2013, which is a continuation of application No. 13/566,171, filed on Aug. 3, 2012, now Pat. No. 8,484,374, which is a continuation of application No.

(Continued)

(51) Int. Cl.
*G06F 11/30* (2006.01)
*H04L 12/721* (2013.01)
(Continued)

(52) U.S. Cl.
CPC .............. *H04L 45/14* (2013.01); *G06F 9/505* (2013.01); *H04L 29/12066* (2013.01);
(Continued)

(58) Field of Classification Search
CPC .............. H04L 45/14; H04L 29/12066; H04L 61/1511; H04L 67/1008; H04L 67/1006; H04L 67/101; H04L 67/1002; H04L 67/1012; H04L 69/32; H04L 47/125; G06F 9/505
USPC ........... 709/238–244, 245; 718/105, 104, 102
See application file for complete search history.

(56) References Cited

U.S. PATENT DOCUMENTS 4,495,570 A 1/1985 Kitajima et al.
4,884,263 A 11/1989 Suzuki
(Continued)

FOREIGN PATENT DOCUMENTS

EP 1045552 A1 10/2000
JP 2000-311130 11/2000
(Continued)

OTHER PUBLICATIONS

Downey, Allen B./Colby College, Using pathchar to estimate Internet link characteristics, Aug. 1999.
(Continued)

*Primary Examiner* — Kenneth R Coulter
(74) *Attorney, Agent, or Firm* — M&B IP Analysts, LLC

(57) ABSTRACT

A method and network device for managing a multi-homed network are provided. The method comprises receiving a request from a client within a client computer network directed to a remote server computer within a remote computer network, wherein the client and the remote server computer are connected through a plurality of data routes, each of the plurality of data routes is connected to a router; selecting a data route from the plurality of data routes to route the received request, wherein the selection of the data route is based on a decision function; translating a source IP address of the client to an IP address corresponding to the selected data route; and routing the received request from the client to the remote server computer over the selected data route.

24 Claims, 20 Drawing Sheets

Related U.S. Application Data

10/449,016, filed on Jun. 2, 2003, now Pat. No. 8,266,319, which is a division of application No. 09/467,763, filed on Dec. 20, 1999, now Pat. No. 6,665,702, which is a continuation-in-part of application No. 09/115,643, filed on Jul. 15, 1998, now Pat. No. 6,249,801.

(51) Int. Cl.
    *G06F 9/50* (2006.01)
    *H04L 29/12* (2006.01)
    *H04L 29/08* (2006.01)
    *H04L 12/803* (2013.01)

(52) U.S. Cl.
    CPC ......... *H04L 47/125* (2013.01); *H04L 61/1511* (2013.01); *H04L 67/101* (2013.01); *H04L 67/1002* (2013.01); *H04L 67/1006* (2013.01); *H04L 67/1008* (2013.01); *H04L 69/32* (2013.01); *H04L 67/1012* (2013.01)

(56) References Cited

U.S. PATENT DOCUMENTS

| | | |
|---|---|---|
| 4,953,162 A | 8/1990 | Lyons et al. |
| 5,142,531 A | 8/1992 | Kirby |
| 5,317,566 A | 5/1994 | Joshi |
| 5,349,682 A | 9/1994 | Rosenberry |
| 5,491,786 A | 2/1996 | Egan et al. |
| 5,511,168 A | 4/1996 | Perlman et al. |
| 5,636,216 A | 6/1997 | Fox et al. |
| 5,774,660 A | 6/1998 | Brendel et al. |
| 5,777,989 A | 7/1998 | Mcgarvey |
| 5,805,586 A | 9/1998 | Perreault et al. |
| 5,825,772 A | 10/1998 | Dobbins et al. |
| 5,867,495 A | 2/1999 | Elliott et al. |
| 5,884,038 A | 3/1999 | Kapoor |
| 5,898,830 A | 4/1999 | Wesinger et al. |
| 5,915,095 A | 6/1999 | Miskowiec |
| 5,951,634 A | 9/1999 | Sitbon et al. |
| 6,003,030 A | 12/1999 | Kenner et al. |
| 6,006,264 A | 12/1999 | Colby et al. |
| 6,009,081 A | 12/1999 | Wheeler et al. |
| 6,038,599 A | 3/2000 | Black et al. |
| 6,047,329 A | 4/2000 | Horikawa et al. |
| 6,064,671 A | 5/2000 | Killian |
| 6,067,545 A | 5/2000 | Wolff |
| 6,068,431 A | 5/2000 | Line |
| 6,070,191 A | 5/2000 | Narendran et al. |
| 6,078,943 A | 6/2000 | Yu |
| 6,078,953 A | 6/2000 | Vaid et al. |
| 6,078,957 A | 6/2000 | Adelman et al. |
| 6,084,892 A | 7/2000 | Benash |
| 6,092,178 A | 7/2000 | Jindal et al. |
| 6,098,091 A | 8/2000 | Kisor |
| 6,098,108 A | 8/2000 | Sridhar et al. |
| 6,112,239 A | 8/2000 | Kenner et al. |
| 6,115,752 A | 9/2000 | Chauhan |
| 6,119,170 A | 9/2000 | Schoffelman et al. |
| 6,122,743 A | 9/2000 | Shaffer et al. |
| 6,138,159 A | 10/2000 | Phaal |
| 6,154,777 A | 11/2000 | Ebrahim |
| 6,167,438 A | 12/2000 | Yates |
| 6,182,139 B1 | 1/2001 | Brendel |
| 6,185,619 B1 | 2/2001 | Joffe et al. |
| 6,205,146 B1 | 3/2001 | Rochberger et al. |
| 6,205,489 B1 | 3/2001 | Kapoor |
| 6,216,163 B1 | 4/2001 | Bharali et al. |
| 6,243,754 B1 | 6/2001 | Guerin et al. |
| 6,249,800 B1 | 6/2001 | Aman et al. |
| 6,249,801 B1 | 6/2001 | Zisapel et al. |
| 6,266,335 B1 | 7/2001 | Bhaskaran |
| 6,269,391 B1 | 7/2001 | Gillespie |
| 6,272,127 B1 | 8/2001 | Golden et al. |
| 6,282,569 B1 | 8/2001 | Wallis et al. |
| 6,286,045 B1 | 9/2001 | Griffiths et al. |
| 6,297,823 B1 | 10/2001 | Bharali et al. |
| 6,298,383 B1 | 10/2001 | Gutman et al. |
| 6,304,913 B1 | 10/2001 | Rune |
| 6,314,093 B1 | 11/2001 | Mann et al. |
| 6,324,580 B1 | 11/2001 | Jindal et al. |
| 6,327,622 B1 | 12/2001 | Jindal et al. |
| 6,347,078 B1 | 2/2002 | Narvaez-Guarnieri et al. |
| 6,359,879 B1 | 3/2002 | Carvey et al. |
| 6,360,262 B1 | 3/2002 | Guenthner et al. |
| 6,363,502 B1 | 3/2002 | Jeddeloh |
| 6,370,584 B1 | 4/2002 | Bestavros et al. |
| 6,381,627 B1 | 4/2002 | Kwan et al. |
| 6,389,462 B1 | 5/2002 | Cohen et al. |
| 6,415,323 B1 | 7/2002 | McCanne et al. |
| 6,421,732 B1 | 7/2002 | Alkhatib et al. |
| 6,446,121 B1 | 9/2002 | Shah et al. |
| 6,449,647 B1 | 9/2002 | Colby et al. |
| 6,456,597 B1 | 9/2002 | Bare |
| 6,457,054 B1 | 9/2002 | Bakshi |
| 6,480,508 B1 | 11/2002 | Mwikalo et al. |
| 6,487,177 B1 | 11/2002 | Weston-Dawkes |
| 6,502,125 B1 | 12/2002 | Kenner et al. |
| 6,502,135 B1 | 12/2002 | Munger et al. |
| 6,542,468 B1 | 4/2003 | Hatakeyama |
| 6,546,516 B1 | 4/2003 | Wright et al. |
| 6,549,516 B1 | 4/2003 | Albert et al. |
| 6,556,575 B1 | 4/2003 | Denio et al. |
| 6,597,684 B1 | 7/2003 | Gulati et al. |
| 6,601,084 B1 | 7/2003 | Bhaskaran et al. |
| 6,606,708 B1 | 8/2003 | Devine et al. |
| 6,615,357 B1 | 9/2003 | Boden et al. |
| 6,618,761 B2 | 9/2003 | Munger et al. |
| 6,633,544 B1 | 10/2003 | Rexford et al. |
| 6,650,621 B1 | 11/2003 | Maki-Kullas |
| 6,665,702 B1 | 12/2003 | Zisapel et al. |
| 6,680,947 B1 | 1/2004 | Denecheau et al. |
| 6,687,731 B1 | 2/2004 | Kavak |
| 6,697,864 B1 | 2/2004 | Demirtjis et al. |
| 6,718,359 B2 * | 4/2004 | Peless et al. ............ 718/105 |
| 6,735,631 B1 | 5/2004 | Oehrke et al. |
| 6,748,439 B1 | 6/2004 | Monachello et al. |
| 6,754,181 B1 | 6/2004 | Elliott et al. |
| 6,810,411 B1 | 10/2004 | Coughlin et al. |
| 6,888,834 B1 | 5/2005 | Wood et al. |
| 7,010,604 B1 | 3/2006 | Munger et al. |
| 7,899,910 B1 | 3/2011 | Mosleh et al. |
| 7,984,148 B2 * | 7/2011 | Zisapel et al. ............ 709/226 |
| 8,266,319 B2 | 9/2012 | Zisapel et al. |
| 8,484,374 B2 * | 7/2013 | Zisapel et al. ............ 709/241 |
| 2001/0049741 A1 | 12/2001 | Skene et al. |
| 2002/0002615 A1 | 1/2002 | Bhagavath |
| 2002/0038339 A1 | 3/2002 | Xu |
| 2002/0087722 A1 | 7/2002 | Datta et al. |
| 2002/0199014 A1 | 12/2002 | Yang et al. |
| 2003/0140142 A1 | 7/2003 | Marples et al. |

FOREIGN PATENT DOCUMENTS

| | | |
|---|---|---|
| WO | 9857275 | 12/1998 |
| WO | 0028713 | 5/2000 |
| WO | 01/41362 | 6/2001 |

OTHER PUBLICATIONS

Egevang, K., et al./Network Working Group RFC: 1631, The IP Network Address Translator (NAT), May 1994.

F5 Networks, Inc., 3DNS Installation & User's Guide v1.0, v1.03 & v1.04 and Big-IP Installation and User's Guide v.2.0 & v.2.01 ("3DNS"), As early as 1998.

Pai, Vivek S., et al./Dept. of Electrical and Computer Engineering, Rice University, Locality-Aware Request Distribution in Cluster-based Network Servers, Oct. 1998.

Praveen Akkiraju and Yakov Rekhter, A Multihoming Solution Using NATs, IETF Internet-Draft draft-akkiraju-nat-multihoming-00.txt ("Akkiraju"), Nov. 1998.

Freedman, Avi, BGP 102: Scaling the Network, 1998.

Freedman, Avi, How to Multi-Home, Jan. 1998.

(56) References Cited

OTHER PUBLICATIONS

Freedman, Avi, ISP Tech Talk—Configuring a Cisco Router, Part 1: Background, Dec. 1997.
Freedman, Avi, ISP Tech Talk—DNS Servers and Provider—Independent Address Space, Jul. 1998.
Freedman, Avi, ISP Tech Talk—Where We Are in the "Routing Columns" Series, Jun. 1997.
Freedman, Avi, ISP Tech Talk—Your Own Address Space, Apr. 1997.
Freedman, Avi, Multihoming for the Small ISP, Dec. 1, 1998.
Freedman, Avi, Optimal External Route Selection: Tips and Techniques for ISPs, Nov. 8, 1998.
Fuller, V., et al/Network Working Group RFC: 1519, Classless Inter-Domain Routing (CIDR): an Address Assignment and Aggregation Strategy, Sep. 1993.
Gengler, Barbara/Internetwork Magazine, RND Server Eases Web Site Congestion, 1996.
Genuity, Hopscotch Provisioning Guide, Release 3.0 Draft, 2000, found on Aug 27, 2014.
Georgiadis, L., et al, Optimal Multiplexing on a Single Link: Delay and Buffer Requirements, 1997.
Georgiadis, L., et al., Efficient Network QoSProvisioning Based on per Node Traffic Shaping, 1996.
Goldszmidt, G., et al., Scaling Internet Services by Dynamic Allocation of Connections, 1999.
Goldszmidt, G., et al., ShockAbsorber. A TCP Connection Router (Extended Abstract), 1997.
Gu'rin, Roch, et al., QoS-based Routing in Networks with Inaccurate Information: Theory and Algorithms, 1997.
Gu'rin, Roch, et al., Quality-of-Service in Packet Networks Basic Mechanisms and Directions, 1999.
Hambridge, Sally, et al./Usenix, Just Type Make! Managing Internet Firewalls Using Make and Other Publicly Available Utilities, 1999.
Hasenstein, Michael, IP Address Translation, 1997.
Hirse, Mohamed/North American Network Operators Group (NANOG), Re: RADWare Linkproof? (or better ways to multihome), Nov. 2000.
Howard Berkowitz, To Be Multihomed: Requirements & Definitions, IETF Internet-Draft draftberkowitz-multirqmt-01.txt (•Berkowitz•), Mar. 1998.
Ion Stoica and Hui Zhang, Lira: An Approach for Service Differentiation in the Internet ("Stoica"), Jul. 10, 1998.
Jubin, John, et al./Proceedings of the IEEE, The DARPA Packet Radio Network Protocols (Invited Paper), Jan. 1987.
Kohlhepp, Robert J./Network Computing, Web Server Director Keeps Intersections Clear, Jan. 15, 1997.
Lee, Gil-Haeng/Electronics Telecommunications Research Institute, Korea, Using System State Information for Adaptive State Polling Policy in Distributed Load Balancing, 1997.
Lewis, Chris, et al., Multihoming Your Internet Service with BGP, Jul. 15, 1997.
M. Shand and M. Thomas, Multi-homing Support in IPv6, IETF Internet-Draft draft-shand-ipv6-multi-homing-00.txt v, Feb. 19, 1996.
Mah, Bruce A./Security and Networking Research Dept., Sandi National Laboratories, Pchar: Child of Pathchar, Jul. 21, 1999.
Maimon/TCP Port Stealth, vol. 7, Issue 49., Port Scanning without the SYN flag, 1996.
Metcalfe, Bob/Patrickweb.com, Metcalfe on the Womplex, Jul. 1, 1996.
Milner, Clark/Cisco Systems, Cisco White Paper—Network Address Translation (NAT), 1997.
Mockapetris, P./Network Working Group RFC: 1034, Domain Names—Concepts and Facilities, Nov. 1997.
Mockapetris, P./Network Working Group RFC: 1035, Domain Names—Implementation and Specification, Nov. 1987.
Morrissey, Peter, Multihoming With BGP4, Dec. 13, 1999.
Moy, J./Network Working Group RFC: 2178, OSPF, Version 2, Jul. 1997.
Moy, J./Network Working Group RFC: 2328, OSPF, Version 2, Apr. 1998.
Moy, John T., OSPF Anatomy of an Internet Routing Protocol, 1998.
Nanog, Multihoming—Benefit vs. Impact, 1996.
Odlyzko, Andrew/AT&T Labs, Paris Metro Pricing for the Internet, 1999.
Orda, Ariel, et al./Dept. of Electrical Engineering, Technion—Israel Institute of Technology, Multihoming in Computer Networks: A Topology-Design Approach, Jun. 1989.
P. Srisuresh and D. Gan, Load Sharing using IP Network Address Translation (LSNAT), IETF RFC 2391 ("RFC2391"), Aug. 1998.
P. Srisuresh and Matt Holdrege, IP Network Address Translator (NAT) Terminology and Considerations, IETF Internet Draft draft-ietf-nat-terminology-01.txt ("RFC 2663 Draft"), Oct. 1998.
Packet Magazine/Cisco Systems, Inc., How to Cost-Effectively Scale Web Servers (LocalDirector), 1996.
R. Guerin, A. Orda, and D. Williams, QoS Routing Mechanisms and OSPF Extensions, IETF Internet-Draft draft-guerin-qos-routing-ospf-00.txt ("QoS Routing Mechanisms"), Nov. 5, 1996.
Rabinovich, Michael, et al., A Dynamic Object Replication and Migration Protocol for an Internet Hosting Service, May 1999.
Radware, WSD Family, Prior to Dec. 1998.
Rekhter, Y., et al./Network Working Group RFC: 1518, An Architecture for IP Address Allocation with CIDR, Sep. 1993.
Rekhter, Y., et al./Network Working Group RFC: 1771, A Border Gateway Protocol 4 (BGP-4), Mar. 1995.
Rekhter, Y., et al./Network Working Group RFC: 1918, Address Allocation for Private Internets, Feb. 1996.
Resonate, Resonate Central Dispatch Resonate Commander Installation Guide, Version 3.0, 1999.
Resonate, Resonate Central Dispatch User Guide, Version 3.2, 2000.
Resonate, Resonate Global Dispatch FAQs, Apr. 1999.
Resonate, Resonate White Paper—Maximum Performance with Fine-Grained Control: A Requirement for E-Business Applications and Services, Aug. 1999.
Resonate, Resonate White Paper—The Power of Distributed Software for Internet Site Traffic Management, Feb. 1999.
Robert L. Carter and Mark E. Crovella, Dynamic Server Selection using Bandwidth Probing in Wide-Area Networks ("Carter"), Mar. 18, 1996.
Rogers, Amy/CMP Media Communications Week/Radware Ltd., Easing Web Jam with Distributed Servers, 1996.
Savage, Stefan, et al./Dept. of Computer Science and Engineering, University of Washington, Seattle, The End-to-End Effects of Internet Path Selection, Sep. 1999.
Savage, Stefan, et al./IEEE, Detour: Informed Internet Routing and Transport, Jan. 1999.
Schemers, III, Roland/Sunsoft, Inc./Usenix, Ibnamed: A Load Balancing Name Server in Perl, 1997.
Scott Shenker, David Clark, Deborah Estrin, and Shai Herzog, Pricing in computer networks: reshaping the research agenda ("Shenker"), 1996.
Srisuresh, P., et al./ Nat Working Group, DNS extensions to Network Address Translators (DNS_ALG), Internet Draft, Jul. 1998.
Srisuresh, P., et al./Network Working Group RFC: 2663, IP Network Address Translator (NAT) Terminology and Considerations, Aug. 1999.
Srisuresh, P., et al./Network Working Group RFC: 2694, DNS extensions to Network Address Translators (DNS_ALG), Sep. 1999.
Stewart III, John W., et al., Using BGP Without Consuming a Unique ASN, Internet Draft, Jan. 1997.
T. Bates and Y. Rekhter, Scalable Support for Multi-homed Multiprovider Connectivity, IETF RFC 2260 (RFC 2260, Jan. 1998.
Taschek, James/Internet Computing, A Well-Balanced Web, Mar. 1998.
The Tolly Group, Alteon 180e Web Switch versus Foundry Networks—ServerIron—TCP Session Processing Performance Evaluation Via Layer 4 Switching, Sep. 1999.
The Tolly Group, Alteon 180e Web Switch versus Foundry Networks—ServerIron and F5 Networks—BIG/ip HA Load-Balancing Device• TCP Session Processing Performance Evaluation via Layer 4 Switching, Nov. 1999.
Tiny Software, Inc., WinRoute Pro 3.0 User's Manual ("WinRoute"), 1998.

(56) References Cited

OTHER PUBLICATIONS

Van Beijnum, Iljitsch/O•Reilly, BGP Book Excerpt—Building Reliable Networks with the Border Gateway Protocol, 2002.
Vik Varma, A Solution to Redundant, Load Balanced Firewall Systems ("Varma"), Nov. 2, 1998.
Wang, Zheng, et al./IEEE Journal, vol. 14, No. 7, Quality-of-Service Routing for Supporting Multimedia Applications, Sep. 1996.
Xipeng Xiao and Lionel M. Ni, Internet QoS: A Big Picture ("Xiao"), Mar. 1, 1999.
Xu, Wei Provisional Patent Application No. 60-231,230, titled "Spontaneous Networking Infrastructure", Filing Date: Sep. 8, 2000.
Yu, Jieyun (Jessica)/Internet Engineering Task Force, IPv6 Multihoming with Route Aggregation, Internet Draft, Nov. 1999.
Samrat Bhattacharjee, et al., "Application Layer Anycasting"; Networking and Telecommunications Group, College of Computing, Georgia Institute of Technology, Atlanta, GA; INFOCOM '97; Apr. 1997.
German Goldszmidt, et al.; "Load Distribution for Scalable Web Servers: Summer Olympics 1996—a Case Study"; IBM Watson Research Center.
Mari Korkea-aho; "Scalability in Distributed Multimedia Systems"; Helsinki University of Technology, Laboratory of Information Processing Science; Master's Thesis: Nov. 5, 1995.
Srinivasan Seshan et al.; "SPAND: Shared Passive Network Performance Discovery"; USENIX Symposium on Internet Technologies and Systems; 1997.
Robert L. Carter et al.; "Dynamic Server Selection using Bandwidth Probing in Wide Area Networks"; Computer Science Department, Boston University; Mar. 18, 1996.
Robert L. Carter et al.; "Measuriung Bottleneck Link Speed in Packet-Switched Networks"; Computer Science Department, Boston University; Mar. 15, 1996.
James D. Guyton et al.; "Locating Nearby Copies of Replicated Internet Servers"; University of Colorado at Boulder; Feb. 1995.
Fyodor; "The Art of Port Scanning"; Sep. 1997.
R. Enger et al.; "FYI on a Network Management Tool Catalog: Tools for Monitoring and Debugging TCP/IP Internets and Interconnected Devices"; Network Working Group; Jun. 1993.
Matt Mathis et al.; "Diagnosing Internet Congestion with a Transport Layer Performance Tool"; Proceedings of INET; 1996.
Cisco Distributed Director. Cisco Systems, Inc. 1996.
Deborah Radcliff; "Traffic Jam-includes related articles on long-distance telco revenues, spamming, an emerging high-quality internet2 and Internet use by the National Center for Missing and Exploited Children"; Electronic Commerce—Internet / Web/ Online Service Information; Nov. 1997.
Resonate, Inc.; "Frequently Asked Questions about Resonate Global Dispatch"; Resonate, Inc.; 1997.
FreeBSD Hypertext Man Pages; Mar. 1, 1997.
Mike Muuss; "Using the InterNet Control Message Protocol (ICMP) ECHO facility, measure round-trip delays and packet loss across networks paths"; U.S. Army Ballistic Research Laboratory; Dec. 1983.
Emirical Tools & Technologies; "Dr. Watson (DWTNDA)"; The Network Detective's Assistant v1.2; Nov. 15, 1997.
Russell Mosemann; "Package Net"; PING; 1996.
Traceping; May 14, 1997.
Traceroute—Print the Route Packets take to Network Host; Apr. 22, 1997.
Command-Line Commands Summary; Microsoft; 1995.
Uriel Maimom; "TCP Port Stealth Scanning"; Phrack 49. vol. 7 Issue 49. File 15 of 16; entered in case Apr. 19, 2005.
Internet Protocol: Error and Control Messages (ICMP); entered in case Apr. 19, 2005.
Internet Engineering Task Force. QoS Routing Mechanisms and OSPF Extensions; Nov. 5, 1996.
Kimberly C. Claffy et al; "Measurement Considerations for Assessing Unidirectional Latencies"; Computer Systems Laboratory; San Diego Supercomputer Center; 1993.
Praveen Akkiraju et al.; "Enabling Enterprise Multihoming with Cisco IOS Network Address Translation (NAT)"; Cisco Systems Inc., Online!; 1997.
Yamamoto K.; "Multi-homed Sites I the Ipv6 Environment"; IPNG Working Group, Online!; Jan. 13, 1999.
Greenfield D.; "Radware LinkProof"; Networkmagazine.com, Online! Dec. 1999.
Mark E. Crovella et al.; "Dynamic Server Selection in the Internet"; in Proceedings of the Third IEEE Workshop on the Architecture and Implementation of High Performance Communication Subsytems (HPCS '95); Jun. 30, 1995.
Peter Sanders; "A Detailed Analysis of Random Polling Dynamic Load Balancing"; 1994 International Symposium on Parallel Architectures, Algorithms and Networks, pp. 382-389; 1994.
Azer Bestavros; "Speculative Data Dissemination and Service to Reduce Server Load, Network Traffic, and Service Time in Distributed Information System"; IEEE 1996, pp. 180-187; 1996.
Gil-Haeng Lee; "Using System State Information for Adaptive State Polling Policy in Distributed Load Balancing"; 1997 IEEE, pp. 166-173; 1997.
Bruce Hajek; "Performance of Global Load Balancing by Local Adjustment"; Transactions on Information Theory, vol. 36, Issue 6: pp. 1398-1414; Nov. 1990.
Phillip Krueger et al.; "Adaptive Location Policies for Global Scheduling"; IEEE Transactions on Software Engineering, vol. 20, Issue 6: pp. 432-444; Jun. 1994.
Gil Haeng Lee et al.; "A Sender-Initiated Adaptive Load Balancing Scheme Based on Predictable State Knowledge"; IEICE Transactions on Information and Systems, E79-D:3; pp. 209-221; Mar. 1996.
E. Haddad; "Optimal Load Sharing in Dynamically Heterogeneous Systems"; Proceedings Seventh IEEE Symposium on Parallel and Distributed Processing (Cat. No. 95TB8183): pp. 346-353; 1995.
Gil-Haeng Lee et al.; "An Adaptive Load Balacing Algorithm Using Simple Prediction Mechanism"; Proceedings Ninth International Workshop on Database and Expert Systems Applicatins pp. 496-450; 1998.
B. Bing and R. Subramanian; Abstract of: "An Efficient Multiaccess Technique with Stability Control for Multimedia Personal Communication Networks"; Journal of the Institute of Engineers Singapore; vol. 38, Issue 1: pp. 17-25; 1998.
R.S. Engelschall; "Balancing Your Website, Practical Approaches for Distributing HTTP Traffic"; Web Techniques, vol. 3, Issue 5: pp. 45-46, 48-50, 52; 1998.
Chin Lu and Sau Ming Lau; Abstract of "A Performance Study on Different Classes of Load Balancing Algorithms"; Proceedings of the Fourteenth International Conference Applied Informatics; pp. 39-42; 1996.
Gil-Haeng Lee et al.: "A Prediction-Based Adaptive Location Policy for Distributed Load Balancing"; Journal of Systems Architecture, vol. 42, Issue 1: pp. 1-18; Aug. 1996.
Gil-Haeng Lee et al.; Abstract of "A Sender-Initiated Adaptive Load Balancing Scheme Based on Predictable State Knowledge"; IEICE Transactions on Information and Systems; vol. E79-D, Issue 3: pp. 209-221; Mar. 1996.
K. Benmohammed-Mahieddine et al.; "A Periodic Symmetrically-Initiated Load Balancing Algorithm for Distributed Systems"; Proceedings of the 14th International Conference on Distributed Computing Systems (Cat. No. 94CH3450-4): pp. 616-623; 1994.
G. Goldszmidt and G. Hunt; "NetDispatcher: A TCP Connection Router"; IBM Research Report, pp. 1-20; RC20853; May 19, 1997.
Hopscotch (TM), "Genuity's Industrial Strength Solution to Net Traffic"; entered in case Apr. 19, 2005.
Rodney Joffe and Henry Heflich; Hopscotch (TM) Optimized Web Access; Mar. 11, 1997.
Aly E. El-Abd et al., "A Neural Network Approach for Dynamic Load Balancing in Homogeneous Distributed Systems"; IEEE 1997; pp. 628-629; 1997.
Pritchard; "Load Balanced Deadlock-Free Deterministic Routing of Arbitrary Networks"; ACM 1992; pp. 225-234; 1992.
Shaikh et al.; "Load-Sensitive Routing of Long-Lived IP Flows"; ACM 1999; pp. 215-226; 1999.

(56) References Cited

OTHER PUBLICATIONS

Franco et al.; "A New Method to Make Communication Latency Uniform: Distributed Routing Balancing"; ACM 1999; pp. 210-219; 1999.
Crochat et al.; "A Path Selection Method in ATM Using Pre-Computation"; Proceedings of IZS; Feb. 1996; pp. 1-12.
Acuitive, Inc., Server Load Balancing Product Summary and Analysis, 1997.
Almeida, Jussara, et al./Computer Sciences Dept., University of Wisconsin-Madison, Providing Differentiated Levels of Service in Web Content Hosting, 1998.
Alteon Web Systems, Firewall Load Balancing Web Switching to Optimize Firewall Performance, Jun. 1999.
Alteon Web Systems/Electronic Engineering Times, 3Com emphasize control of flows across stack—New strategies devised for server load balancing, Jun. 11, 1999.
Alteon Websystems Incorporated, "The Ins and Outs of Layer 4+ Switching," presented on Tuesday, Feb. 2, 1999 at NANOG 15 in Denver, Colorado ("Alteon"), Feb. 2, 1999.
Andresen, Daniel, et al./Department of Computer Science, University of California, SWEB: Towards a Scalable World Wide Web Server on Multicomputers, 1996.
Apostolopoulos, G., et al./University of Maryland, et al., Intra-Domain QoS Routing in IP Networks: A Feasibility and Cost/Benefit Analysis, Sep. 1999.
Avi Freedman, Ethel the Aardvark Goes BGP Routing, ISP Tech Talk, available at and BGP Routing Part I: BGP and Multi-Homing, available at 1997.
Avi Freedman, Multi-Homing With and Without BGP4, ISP Tech Talk, available at May 1997.
Ballard, Bare, Provisional Patent Application No. 60-084278, titled "Load Balancing Switch Protocols", Filing Date: May 4, 1998.
Bassam Halabi / Cisco Press, Internet Routing Architectures ("Halabi"), 1997.
Batra, Rajiv, et al., Provisional Patent Application No. 60-043621, Batra, Rajiv, et al., titled •Method and Apparatus Providing for Automatically Restarting a Client-Server Connection in a Distributed Network•, Filing Date: Apr. 14, 1997.
Berkowitz, Howard C./NANOG13, Interesting Things to do with OSPF, entered in the case on Aug. 29, 2014.
Berkowitz, Howard C./NANOG15, BGP101, entered in the case on Aug. 29, 2014.
Berkowitz, Howard C./NANOG15, Good ISPs have no. Class—Musings on Addressing, entered in the case on Aug. 29, 2014.
Boyle, Padraic/PC Magazine Network Edition, Web Site Traffic Cops—Load balance can provide the busiest Web sites with nonstop performance, 1997.
Braden, R., et al./Network Working Group RFC: 2209, Resource ReSerVation Protocol (RSVP)—Version 1 Message Processing Rules, Sep. 1997.
Brisco, T./Network Working Group RFC: 1794, DNS Support for Load Balancing, Apr. 1995.
Cashell, Nel, Network Address Translator (NAT) Theory and Troubleshooting, Mar. 1, 1998.
Chandra, R., et al./Network Working Group RFC: 1997, BGP Communities Attribute, Aug. 1996.
Chen, E., et al./Network Working Group RFC: 1998, An Application of the BGP Community Attribute in Multi- homing Routing, Aug. 1996.
Chen, Shigang, et al/University of Illinois at Urgana-Champaign, An Overview of Quality of Service Routing for Next-Generation High-Speed Networks: Problems and Solutions, Nov. 1998.
Cidon, Israel, et al/Technion, et al., Multi-Path Routing combined with Resource Reservation, 1997.
Cisco Systems, Cisco 12000 Gigabit Switch Router Family Layer 3 Protection Switching, 1999.
Cisco Systems, Cisco DistributedDirector—New Features, 1997.
Cisco Systems, Cisco LocalDirector User Interface Version 2.x Release Notes, Feb. 1999.
Cisco Systems, Cisco LocalDirector Version 1.6.3 Release Notes, Oct. 1997.
Cisco Systems, Cisco LocalDirector Version 2.2.3 Release Notes, Apr. 1999.
Cisco Systems, Cisco LocalDirector Version 2.x Release Notes, Apr. 1999.
Cisco Systems, Distributed Director Configuration Example overview, 2004.
Cisco Systems, DistributedDirector 2500 Series Installation and Configuration Guide (About this Guide), entered in the case on Aug. 29, 2014.
Cisco Systems, DistributedDirector 2500 Series Installation and Configuration Guide (Appendix A—Maintaining the Cisco DistributedDirector 2500 Series), entered in the case on Aug. 29, 2014.
Cisco Systems, DistributedDirector 2500 Series Installation and Configuration Guide (Appendix B—Cable Specifications), entered in the case on Aug. 29, 2014.
Cisco Systems, DistributedDirector 2500 Series Installation and Configuration Guide (Appendix C—System Error Messages), entered in the case on Aug. 29, 2014.
Cisco Systems, DistributedDirector 2500 Series Installation and Configuration Guide (Appendix D—Translated Safety Warnings), entered in the case on Aug. 29, 2014.
Cisco Systems, DistributedDirector 2500 Series Installation and Configuration Guide (Chapter 1—Overview of the Cisco Distributed Director 2500 Series), entered in the case on Aug. 29, 2014.
Cisco Systems, DistributedDirector 2500 Series Installation and Configuration Guide (Chapter 3—Installing the Cisco Distributed-Director 2500 Series), entered in the case on Aug. 29, 2014.
Cisco Systems, DistributedDirector 2500 Series Installation and Configuration Guide (Chapter 4—Configuring Cisco Distributed-Director Interfaces), entered in the case on Aug. 29, 2014.
Cisco Systems, DistributedDirector 2500 Series Installation and Configuration Guide (Chapter 5—Configuring Cisco Routers as DRP Server Agents), entered in the case on Aug. 29, 2014.
Cisco Systems, DistributedDirector 2500 Series Installation and Configuration Guide (Chapter 6—Configuring DNS Caching Name Server Mode), entered in the case on Aug. 29, 2014.
Cisco Systems, DistributedDirector 2500 Series Installation and Configuration Guide (Chapter 7—Configuring HTTP Session Redirector Mode), entered in the case on Aug. 29, 2014.
Cisco Systems, DistributedDirector 2500 Series Installation and Configuration Guide (Chapter 8—Configuring Advanced Features), entered in the case on Aug. 29, 2014.
Cisco Systems, DistributedDirector 2500 Series Installation and Configuration Guide (Chapter 9—Command Summary and Reference), entered in the case on Aug. 29, 2014.
Cisco Systems, Distributor Director 2500 Series Installation and Configuration Guide (Chapter 2—Preparing to Install the Cisco Distributed Director 2500 Series), entered in the case on Aug. 29, 2014.
Cisco Systems, LocalDirector Quick Start Guide and User Reference Manual, Version 1.0, Jul. 1996.
Cisco Systems, LocalDirector Reference Guide, 1997.
Conover, Joel/CMP Media Inc. Network Computing, Get a Running Start on the Fast Track with 100-Mbps Switches and Hubs, Aug. 15, 1996.
Coyote Point, White Paper—Adding Scalability and Availability to TCP/IP Services, Feb. 3, 1996.
Crawley, E./Network Working Group RFC: 2386, A Framework for QoS-based Routing in the Internet, Aug. 1998.
Datta, Sanchaita, Provisional Patent Application No. 60-258946, , Filing Date: Dec. 29, 2000.

* cited by examiner

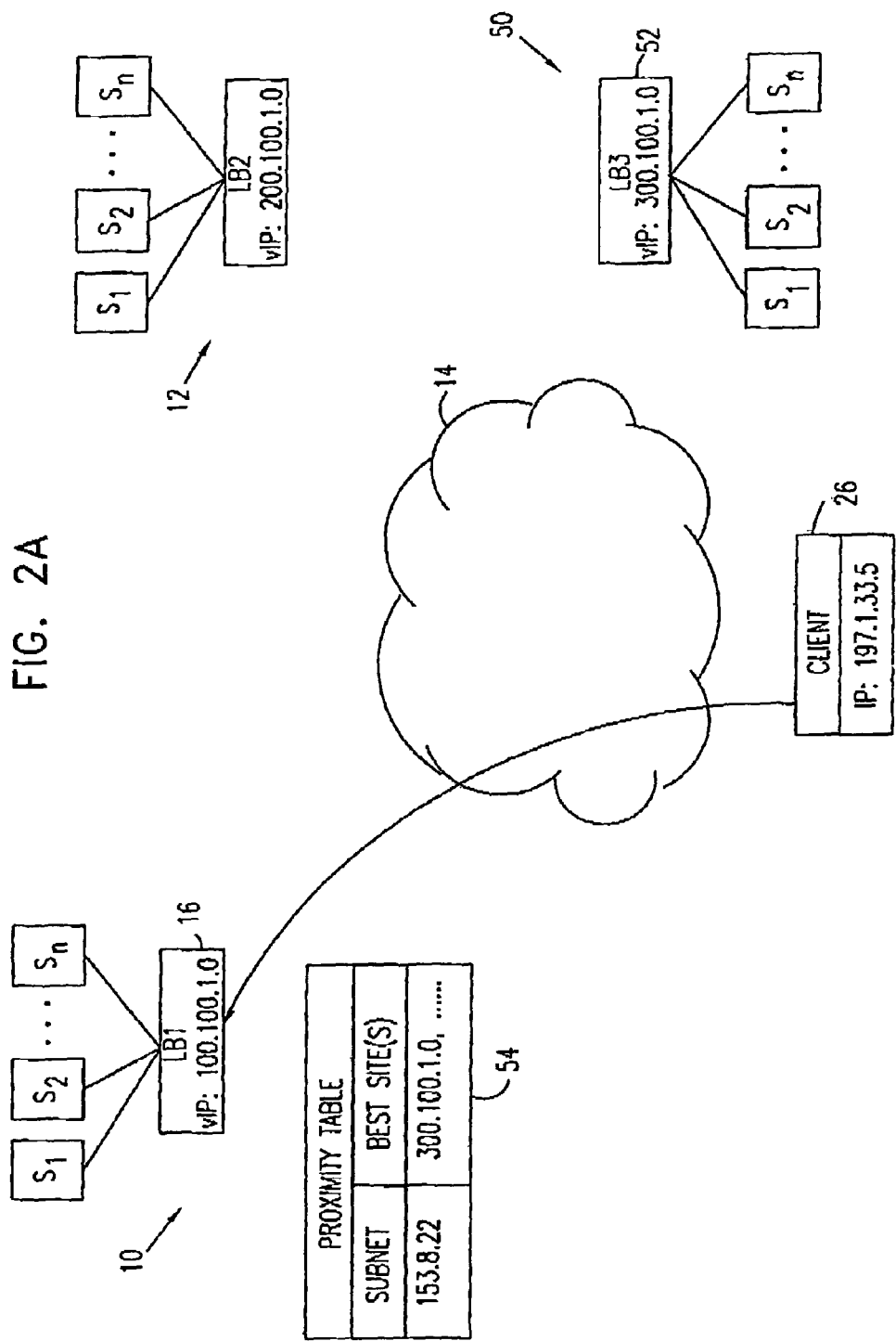

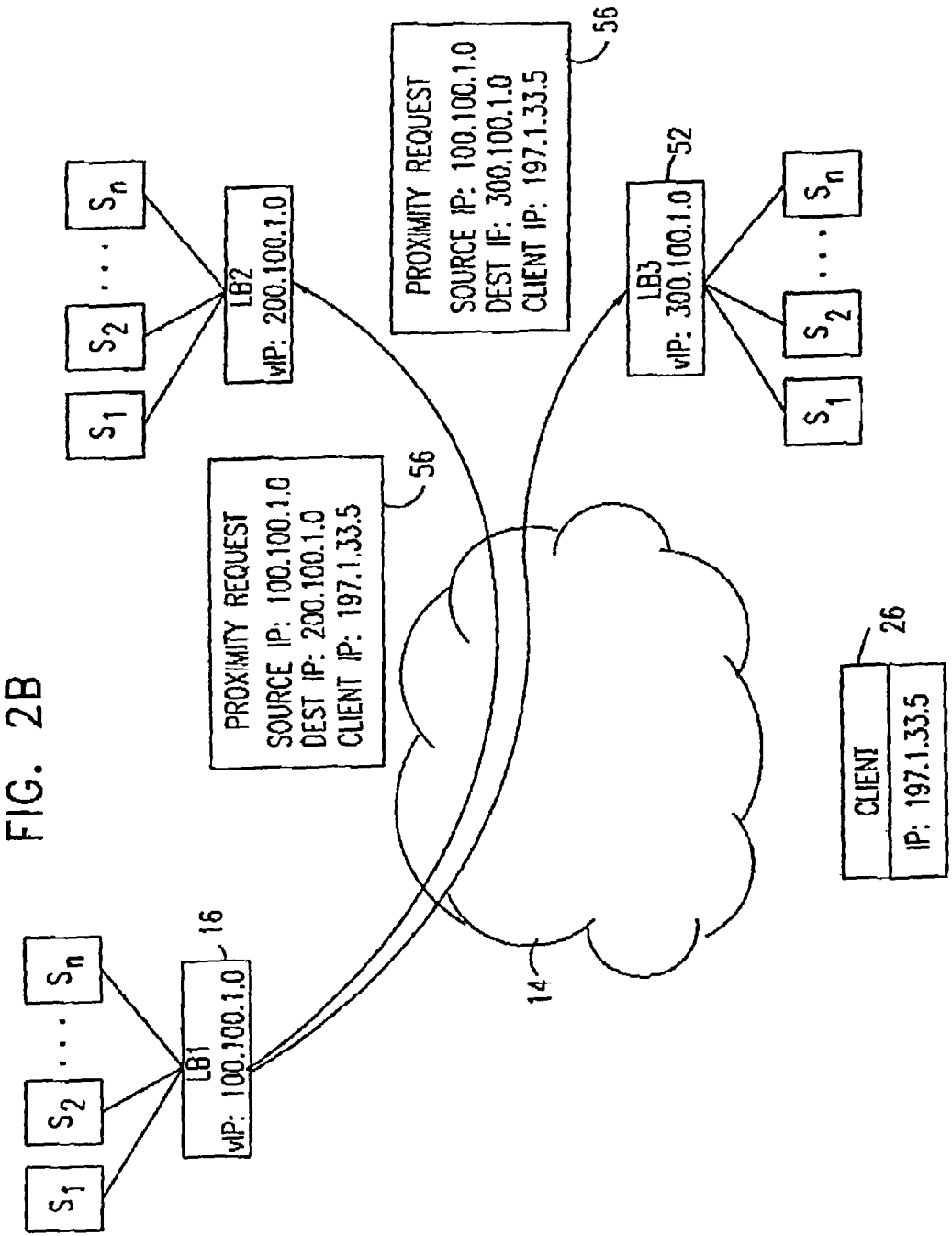

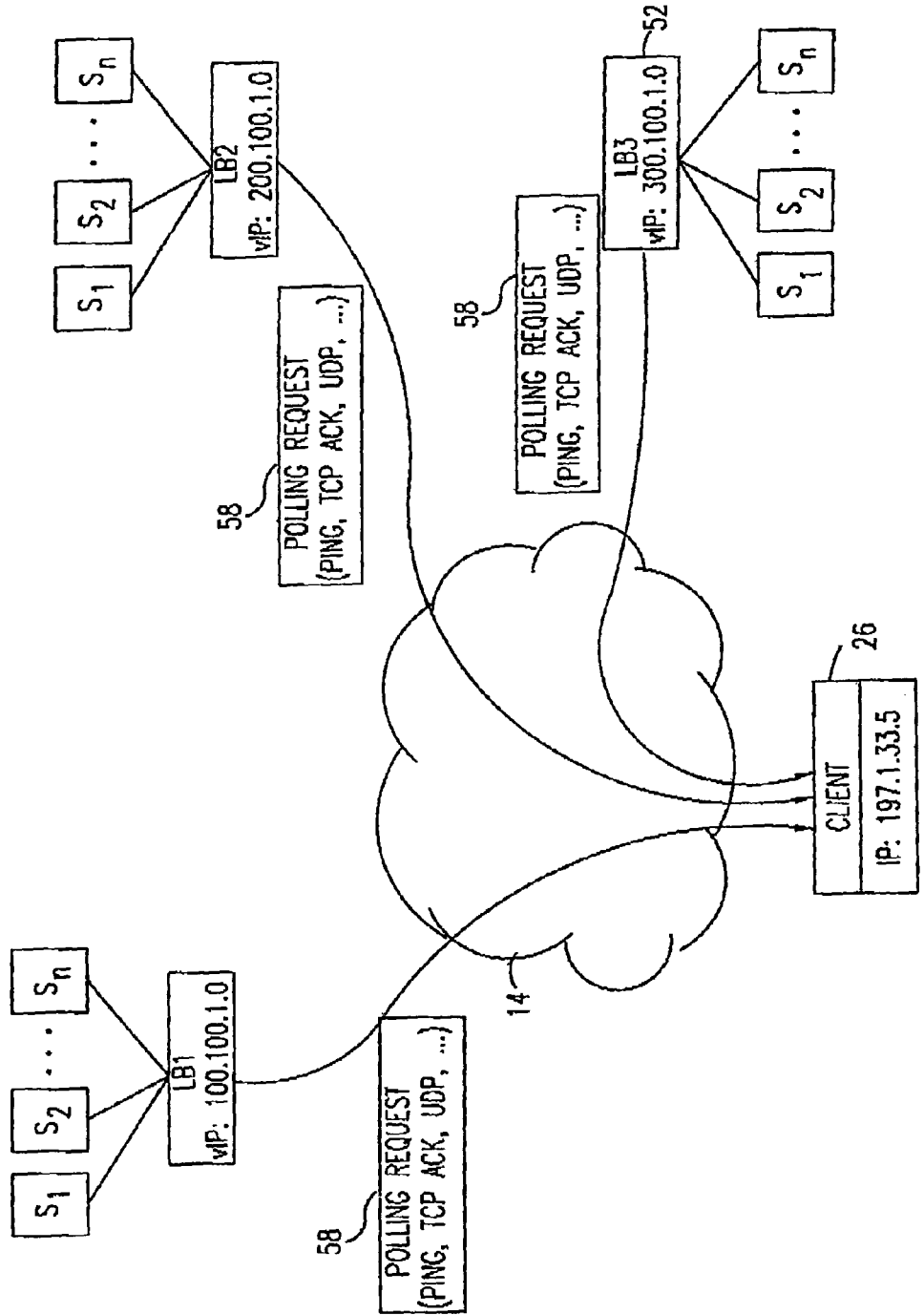

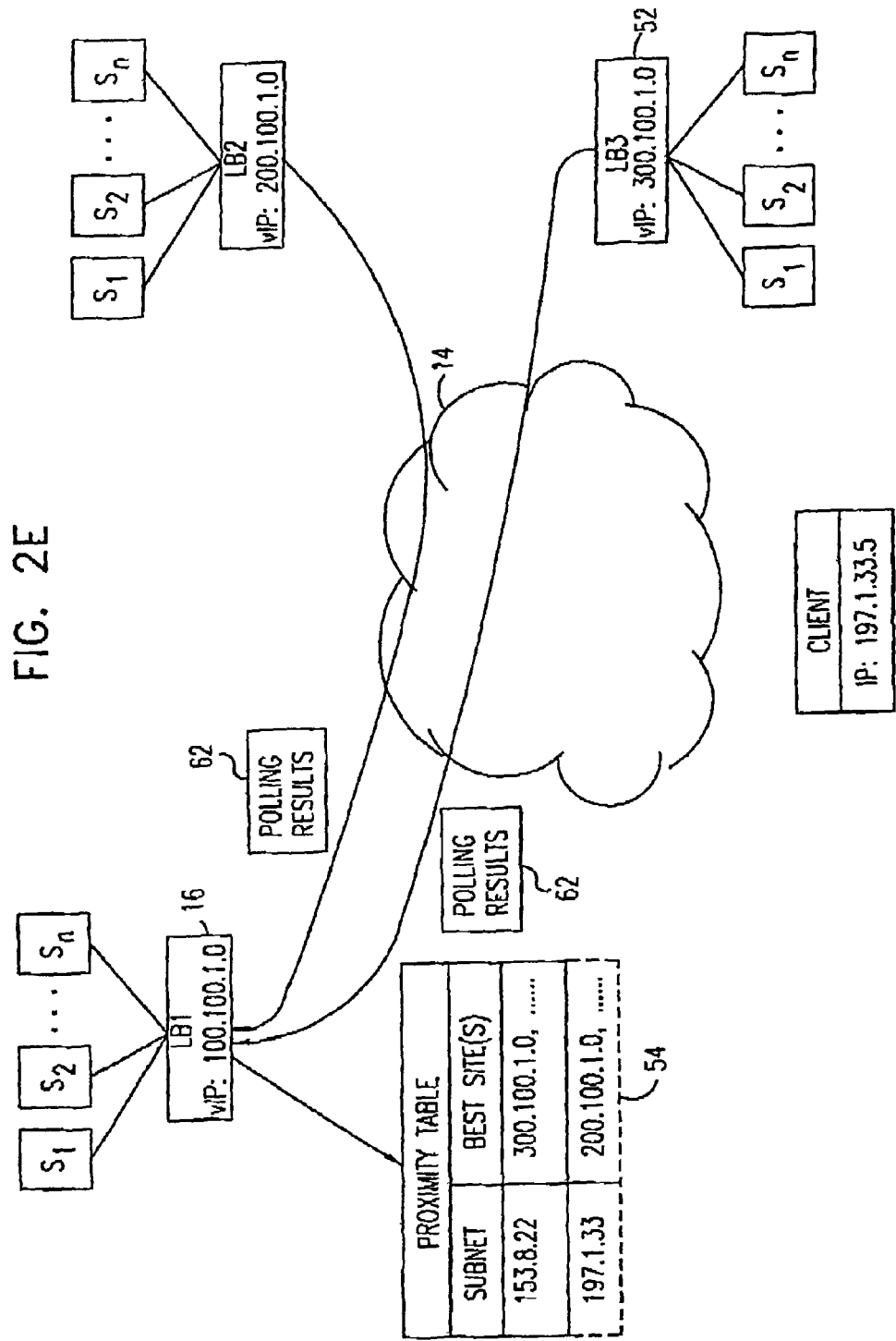

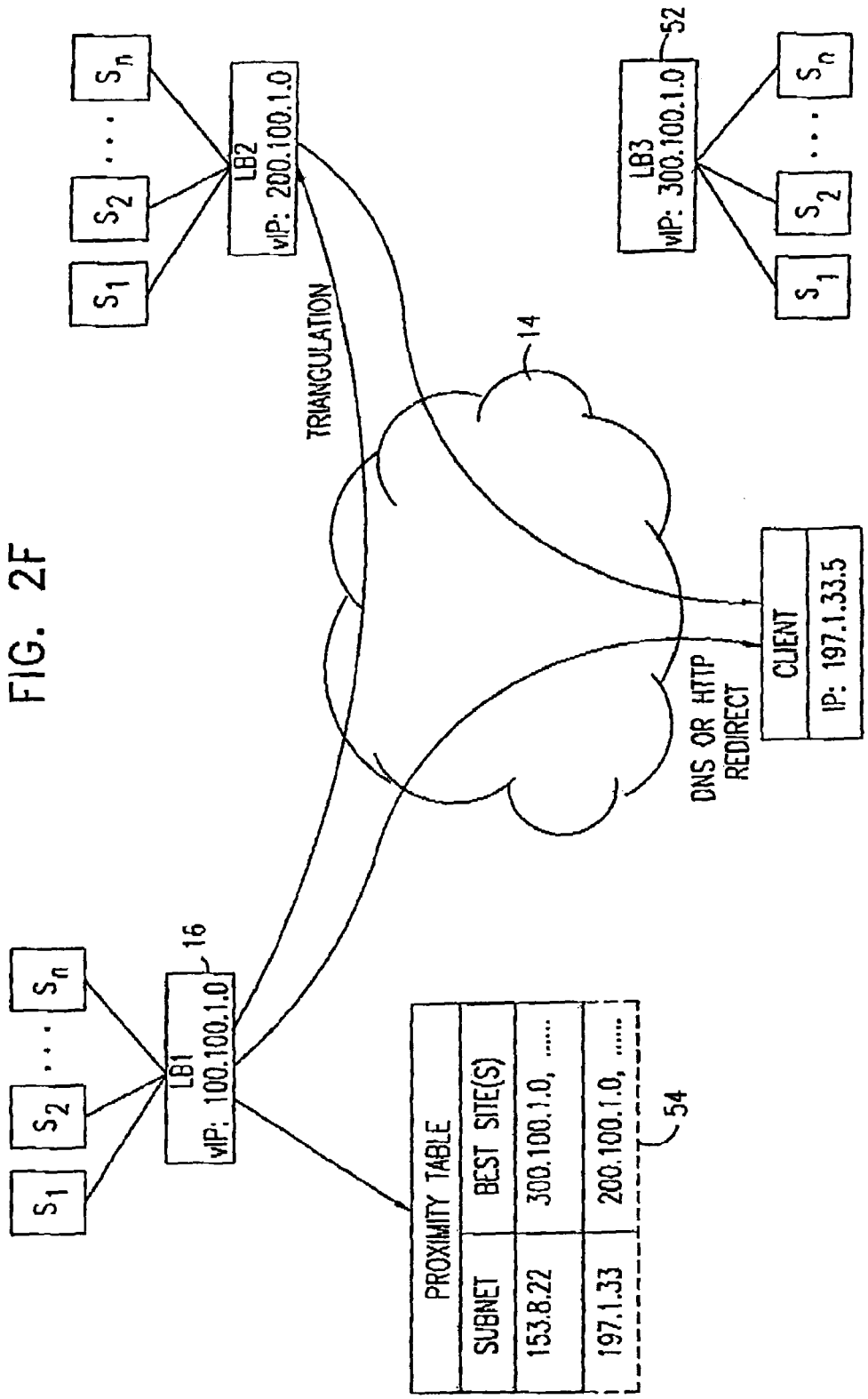

FIG. 7

| DESTINATION TABLE | | |
|---|---|---|
| | ROUTER $R_1$ | ROUTER $R_2$ |
| DESTINATION SUBNET$_1$ | HOPS = $h(1,1)$<br>RESPONSE TIME = $t(1,1)$<br>PACKET LOSS = $p(1,1)$ | $h(2,1)$<br>$t(2,1)$<br>$p(2,1)$ |
| DESTINATION SUBNET$_2$ | HOPS = $h(1,2)$<br>RESPONSE TIME = $t(1,2)$<br>PACKET LOSS = $p(1,2)$ | $h(2,2)$<br>$t(2,2)$<br>$p(2,2)$ |
| ... | ... | ... |

LOAD BALANCING

CROSS REFERENCE TO RELATED APPLICATIONS

This application is a Continuation of U.S. patent application Ser. No. 13/935,683 filed Jul. 5, 2013, now pending, which is a Continuation of U.S. patent application Ser. No. 13/566,171 filed Aug. 3, 2012, now U.S. Pat. No. 8,484,374. The application Ser. No. 13/566,171 is a continuation of U.S. application Ser. No. 10/449,016 filed Jun. 2, 2003, now U.S. Pat. No. 8,266,319. The application Ser. No. 10/449,016 is a Division of U.S. patent application Ser. No. 09/467,763 filed Dec. 20, 1999, now U.S. Pat. No. 6,665,702, which is a Continuation-in-part of U.S. application Ser. No. 09/115,643, filed Jul. 15, 1998, now U.S. Pat. No. 6,249,801. The contents of the above-referenced applications are herein incorporated by reference.

TECHNICAL FIELD

The present invention relates to computer networks in general and, in particular, to load balancing client requests among redundant network servers in different geographical locations.

BACKGROUND

In computer networks, such as the Internet, preventing a server from becoming overloaded with requests from clients may be accomplished by providing several servers having redundant capabilities and managing the distribution of client requests among the servers through a process known as "load balancing."

In one early implementation of load balancing, a Domain Naming System (DNS) server connected to the Internet is configured to maintain several IP addresses for a single domain name, with each address corresponding to one of several servers having redundant capabilities. The DNS server receives a request for address translation and responds by returning the list of server addresses from which the client chooses one address at random to connect to. Alternatively, the DNS server returns a single address chosen either at random or in a round-robin fashion, or actively monitors each of the servers and returns a single address based on server load and availability.

More recently, a device known as a "load balancer," such as the Web Server Director, commercially available from the Applicant/assignee, has been used to balance server loads as follows. The load balancer is provided as a gateway to several redundant servers typically situated in a single geographical location referred to as a "server farm" or "server cluster." DNS servers store the IP address of the load balancer rather than the IP addresses of the servers to which the load balancer is connected. The load balancer's address is referred to as a "virtual IP address" in that it masks the addresses of the servers to which it is connected. Client requests are addressed to the virtual IP address of the load balancer which then sends the request to a server based on server load and availability or using other known techniques.

Just as redundant servers in combination with a load balancer may be used to prevent server overload, redundant server farms may be used to reroute client requests received at a first load balancer/server farm to a second load balancer/server farm where none of the servers in the first server farm are available to tend to the request.

One rerouting method currently being used involves sending an HTTP redirect message from the first load balancer/server farm to the client instructing the client to reroute the request to the second load balancer/server farm indicated in the redirect message. This method of load balancing is disadvantageous in that it can only be employed in response to HTTP requests, and not for other types of requests such as FTP requests. Another rerouting method involves configuring the first load balancer to act as a DNS server. Upon receiving a DNS request, the first load balancer simply returns the virtual IP address of the second load balancer. This method of load balancing is disadvantageous in that it can only be employed in response to DNS requests where there is no guarantee that the request will come to the first load balancer since the request does not come directly from the client, and where subsequent requests to intermediate DNS servers may result in a previously cached response being returned with a virtual IP address of a load balancer that is no longer available.

When redundant server farms are situated in more than one geographical location, the geographical location of a client may be considered when determining the load balancer to which the client's requests should be routed, in addition to employing conventional load balancing techniques. However, routing client requests to the geographically nearest server, load balancer, or server farm might not necessarily provide the client with the best service if, for example, routing the request to a geographically more distant location would otherwise result in reduced latency, fewer hops, or provide more processing capacity at the server.

SUMMARY

Certain embodiments disclosed herein include a method for managing a multi-homed network. The method comprises receiving a request from a client within a client computer network directed to a remote server computer within a remote computer network, wherein the client and the remote server computer are connected through a plurality of data routes, each of the plurality of data routes is connected to a router; selecting a data route from the plurality of data routes to route the received request, wherein the selection of the data route is based on a decision function; translating a source IP address of the client to an IP address corresponding to the selected data route; and routing the received request from the client to the remote server computer over the selected data route.

Certain embodiments disclosed herein also include a network device for managing a multi-homed network. The network device comprises a processor; and a memory communicatively connected to the processor, wherein the memory contains instructions that, when executed by the processor, configure the network device to: receive a request from a client within a client computer network directed to a remote server computer within a remote computer network, wherein the client and the remote server computer are connected through a plurality of data routes, each of the plurality of data routes is connected to a router; select a data route from the plurality of data routers to route the received request, wherein the selection of the data route is based on a decision function; translate a source IP address of the client to an IP address corresponding to the selected data route; and route the received request from the client to the remote server computer over the selected data route.

BRIEF DESCRIPTION OF THE DRAWINGS

The present invention will be understood and appreciated from the following detailed description, taken in conjunction with the drawings in which:

FIGS. 2A-2F, taken together, are simplified pictorial flow illustrations of a network proximity load balancing system constructed and operative in accordance with another preferred embodiment of the present invention;

FIG. 7 illustrates a typical Destination Table which is compiled by the content router for each router and its respective path in accordance with another preferred embodiment' of the present invention.

DETAILED DESCRIPTION

Figure 1A:
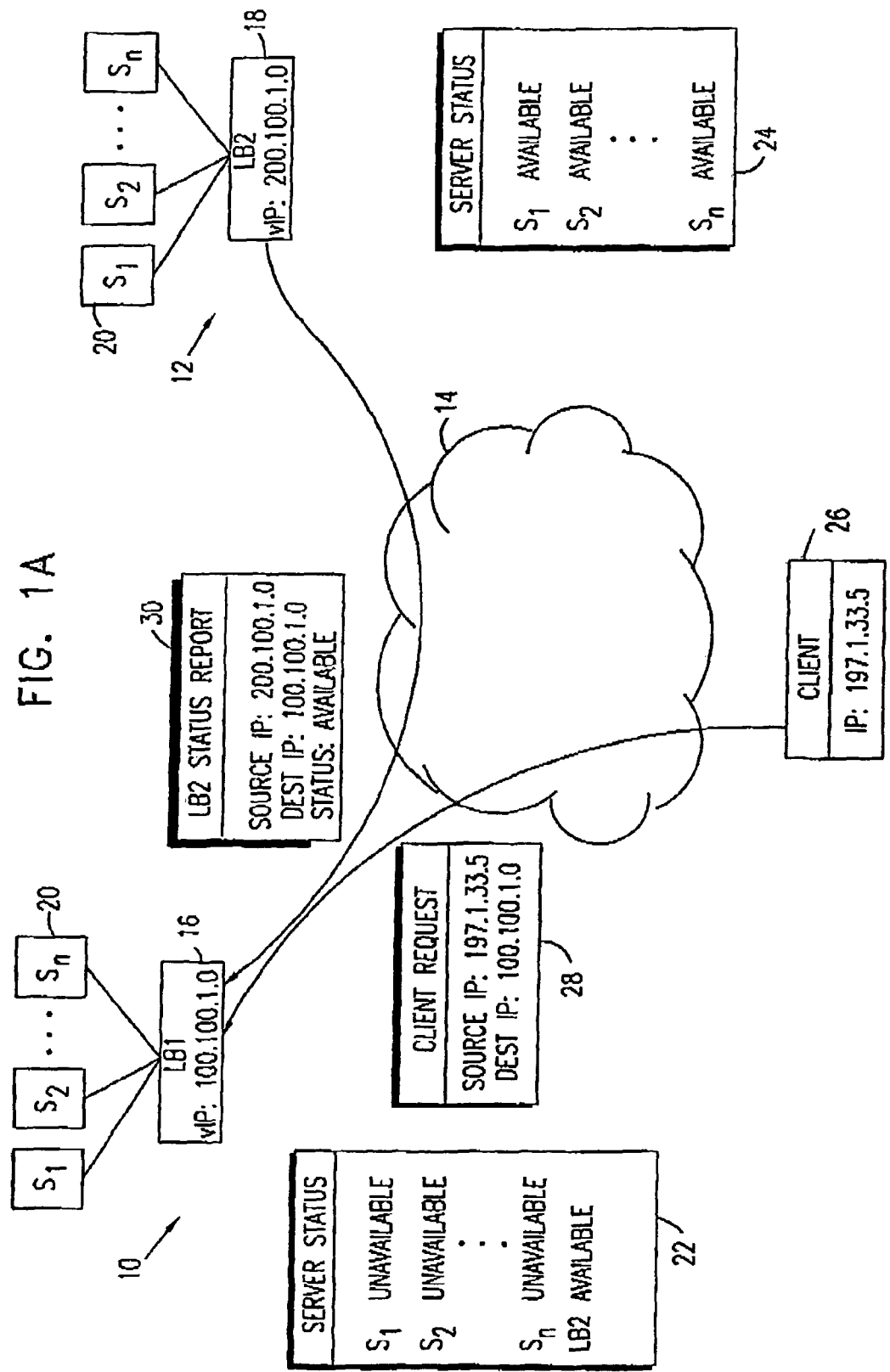
FIGS. 1A-IC, taken together, are simplified pictorial flow illustrations of a triangulation load balancing system constructed and operative in accordance with a preferred embodiment of the present invention.
Figure 1B:
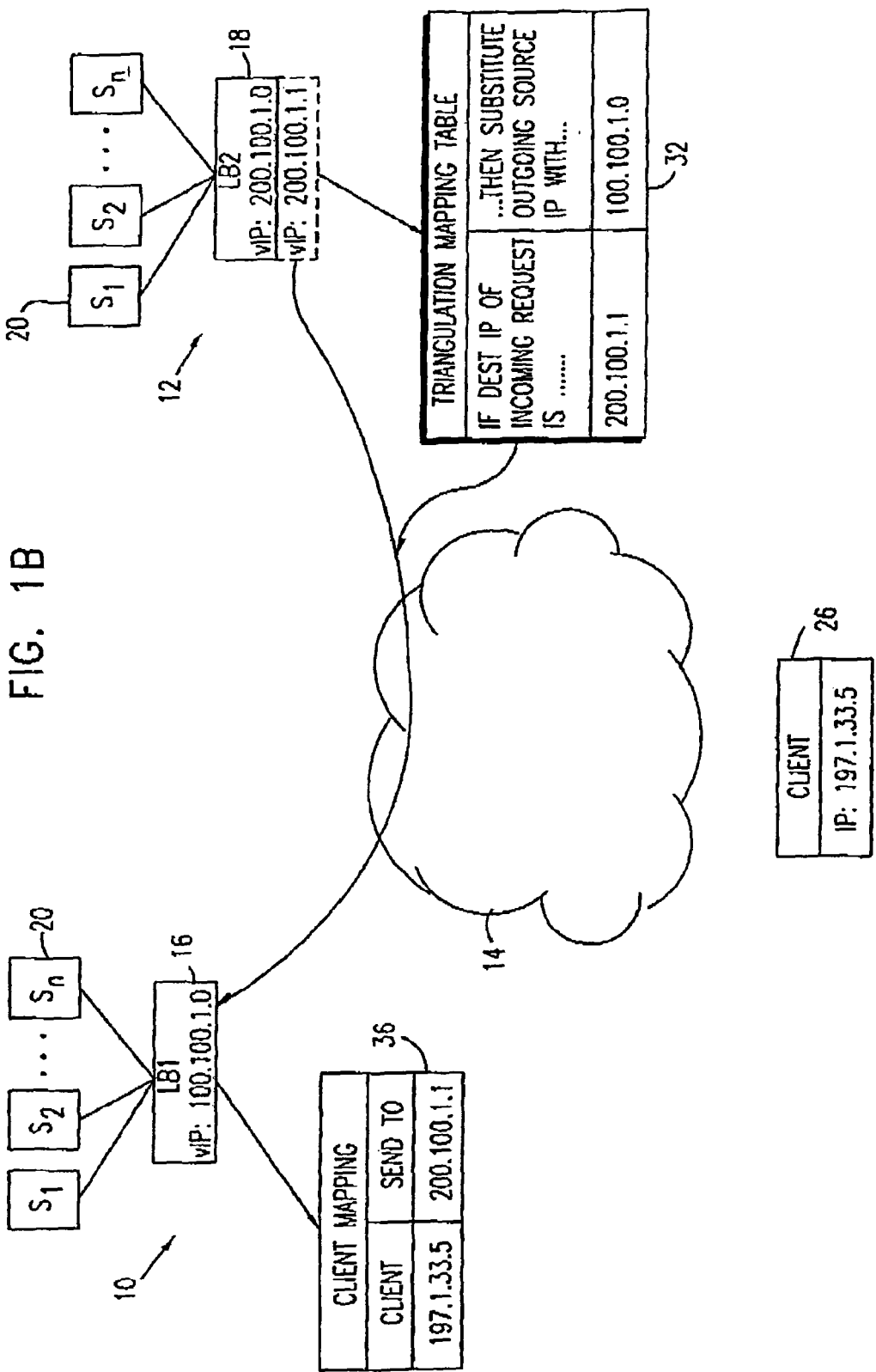
Figure 1C:
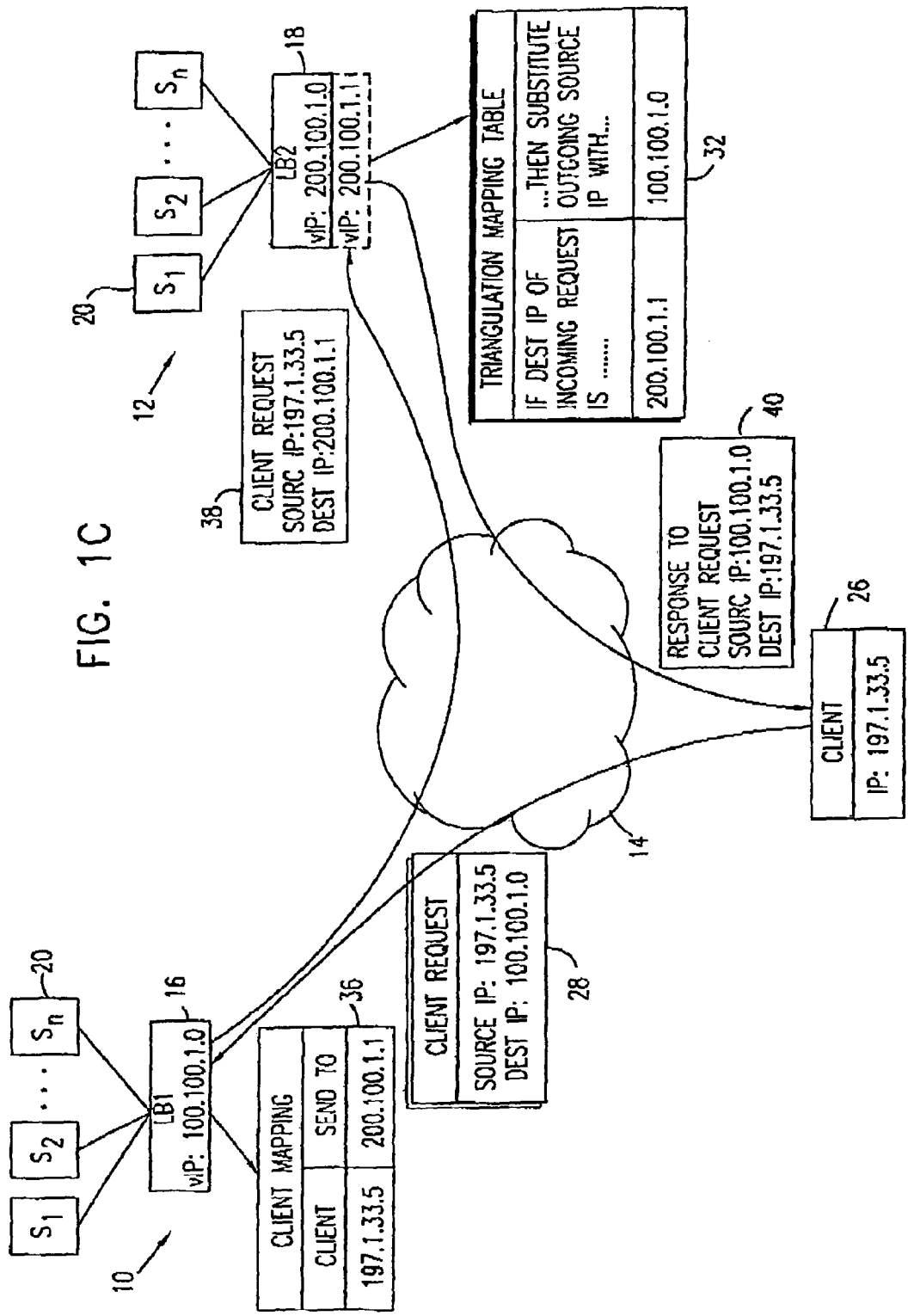

Reference is now made to FIGS. 1A-1C which, taken together, are simplified pictorial flow illustrations of a triangulation load balancing system constructed and operative in accordance with a preferred embodiment of the present invention. Two server farms, generally designated 10 and 12 respectively, are shown connected to a network 14, such as the Internet, although it should be appreciated that more than two server farms may be provided. Server farms 10 and 12 typically comprise a load balancer 16 and a load balancer 18, respectively (hereinafter referred to as LB1 and LB2, respectively), either or both of which may be a dedicated load balancer or a server or router configured to operate as a load balancer, with each of the load balancers being connected to one or more servers 20. LB1 and LB2 typically maintain a server status table 22 and a server status table 24, respectively, the server status tables 22 and 24 indicating the current load, configuration, availability, and other server information as is common to load balancers. LB1 and LB2 also typically periodically receive and maintain each other's overall status and load statistics such that LBI and LB2 can know each other's availability.

Typical operation of the triangulation load balancing system of FIGS. 1A-1C is now described by way of example. As is shown more particularly with reference to FIG. 1A, a client 26, such as any known computer terminal configured for communication via network 14, is shown sending a request 28, such as an FTP or HTTP request, to LB1 whose virtual IP address is 100.100.1.0. In accordance with network transmission protocols, request 28 indicates that the source IP address of the requestor is the IP address 197.1.33.5 of client 26, and the destination IP address is the virtual IP address 100.100.1.0 of LBI. LB2 preferably periodically sends a status report 30 to LB1, the virtual IP address 100.100.1.0 of LB1 being known in advance to LB2. Status report 30 typically indicates the availability of server farm 12 and provides load statistics, which LBI maintains.

LB2 is preferably capable of having multiple virtual IP addresses. It is a particular feature of the present invention for LB2 to designate a currently unused virtual IP address, such as 200.100.1.1, for LBI's use and to store the mapping between the IP address of LB1 and the designated IP address in a triangulation mapping table 32, as is shown more particularly with reference to FIG. 1B. The designated address is referred to herein as the triangulation address and may be preconfigured with LBI or periodically provided to LB1 from LB2. LB1 preferably maintains in a client mapping table 36 a mapping of the IP address 197.1.33.5 of client 26 and the triangulation address 200.100.1.1 of LB2 to which client 26's requests may be redirected.

As shown in the example of FIG. 1A, server status table 22 of LB1 indicates that no servers in server farm 10 are available to service client 26's request, but indicates that server farm 12 is available. Having decided that client 26's request should be forwarded to LB2 in FIG. 1C, LB1 substitutes the destination IP address of request 28 with the virtual IP address 200.100.1.1 of LB2 which is now mapped to the IP address of client 26 as per client mapping table 36, and sends an address-modified client request 38 to LB2.

LB2, upon receiving request 38 at its virtual IP address 200.100.1.1, checks triangulation mapping table 32 and finds that virtual IP address 200.100.1.1 has been designated for LB1's use. LB2 therefore uses the virtual IP address 100.100.1.0 of LB1 as per triangulation mapping table 32 as the source IP address of an outgoing response 40 that LB2 sends to client 26 after the request has been serviced by one of the servers in server farm 12 selected by LB2. It should be appreciated that response 40 must appear to client 26 to come from LB1 or else client 26 will simply ignore response 40 as an unsolicited packet. Client 26 may continue to send requests to LB1 which LB1 then forwards to LB2 at the designated triangulation address. LB2 directs requests to an available server and sends responses to client 26 indicating LBI as the source IP address.

Reference is now made to FIGS. 2A-2F which, taken together, are simplified pictorial flow illustrations of a network proximity load balancing system constructed and operative in accordance with another preferred embodiment of the present invention. The configuration of the system of FIGS. 2A-2F is substantially similar to that of FIGS. 1A-1C except as otherwise described herein below. For illustration purposes, a third server farm, generally designated 50, is shown connected to network 14, although it is appreciated that two or more server farms may be provided. Server farm 50 typically comprises a load balancer 52 (hereinafter referred to as LB3), which may be a dedicated load balancer or may be a server or router configured to operate as a load balancer, with load balancer 52 being connected to two or more servers 20.

Typical operation of the network proximity load balancing system of FIGS. 2A-2F is now described by way of example. As is shown more particularly with reference to FIG. 2A, client 26 is shown sending request 28, such as an FTP or HTTP request, to LB1 whose virtual IP address is 100.100.1.0. LB1 preferably maintains a proximity table 54 indicating subnets and the best server farm site or sites to which requests from a particular subnet should be routed. Determining the "best" site is described in greater detail herein below.

Upon receiving a request, LB1 may decide to service the request or not based on normal load balancing considerations. In any case, LB1 may check proximity table 54 for an entry indicating the subnet corresponding to the subnet of the source IP address of the incoming request. As is shown more particularly with reference to FIG. 2B, if no corresponding entry is found in proximity table 54, LB1 may send a proximity request 56 to LB2 and/or LB3, whose virtual IP addresses are known in advance to LB1. Proximity request 56 indicates the IP address of client 26.

A "network proximity" may be determined for a requestor such as client 26 with respect to each load balancer/server farm by measuring and collectively considering various attributes of the relationship such as latency, hops between client 26 and each server farm, and the processing capacity and quality of each server farm site. To determine comparative network proximity, LB1, LB2 and LB3 preferably each send a polling request 58 to client 26 using known polling mechanisms. While known polling mechanisms included pinging client 26, sending a TCP ACK message to client 26 may be used where pinging would otherwise fail due to an intervening firewall or NAT device filtering out a polling message. A TCP ACK may be sent to the client's source IP address and port. If the client's request was via a UDP connection, a TCP ACK to the client's source IP address and port 80 may be used. One or both TCP ACK messages should bypass any intervening NAT or firewall and cause client 26 to send a TCP RST message, which may be used to determine both latency and TTL. While TTL does not necessarily indicate the number of hops from the client to the load balancer, comparing TTL values from LBI, LB2, and LB3 should indicate whether it took relatively more or less hops.

Another polling method involves sending a UDP request to a relatively high port number at the client, such as 2090. This request would typically be answered with an "ICMP port unreachable" reply, which would indicate the TTL value of the UDP request on arrival at the client. Since the starting TTL value of each outgoing UDP request is known, the actual number of hops to the client may be determined by subtracting the TTL value on arrival at the client from the starting TTL value. A combination of pinging, TCP ACK, UDP, TCP SYN, and other polling techniques may be used since any one polling request might fail.

Figure 2D:
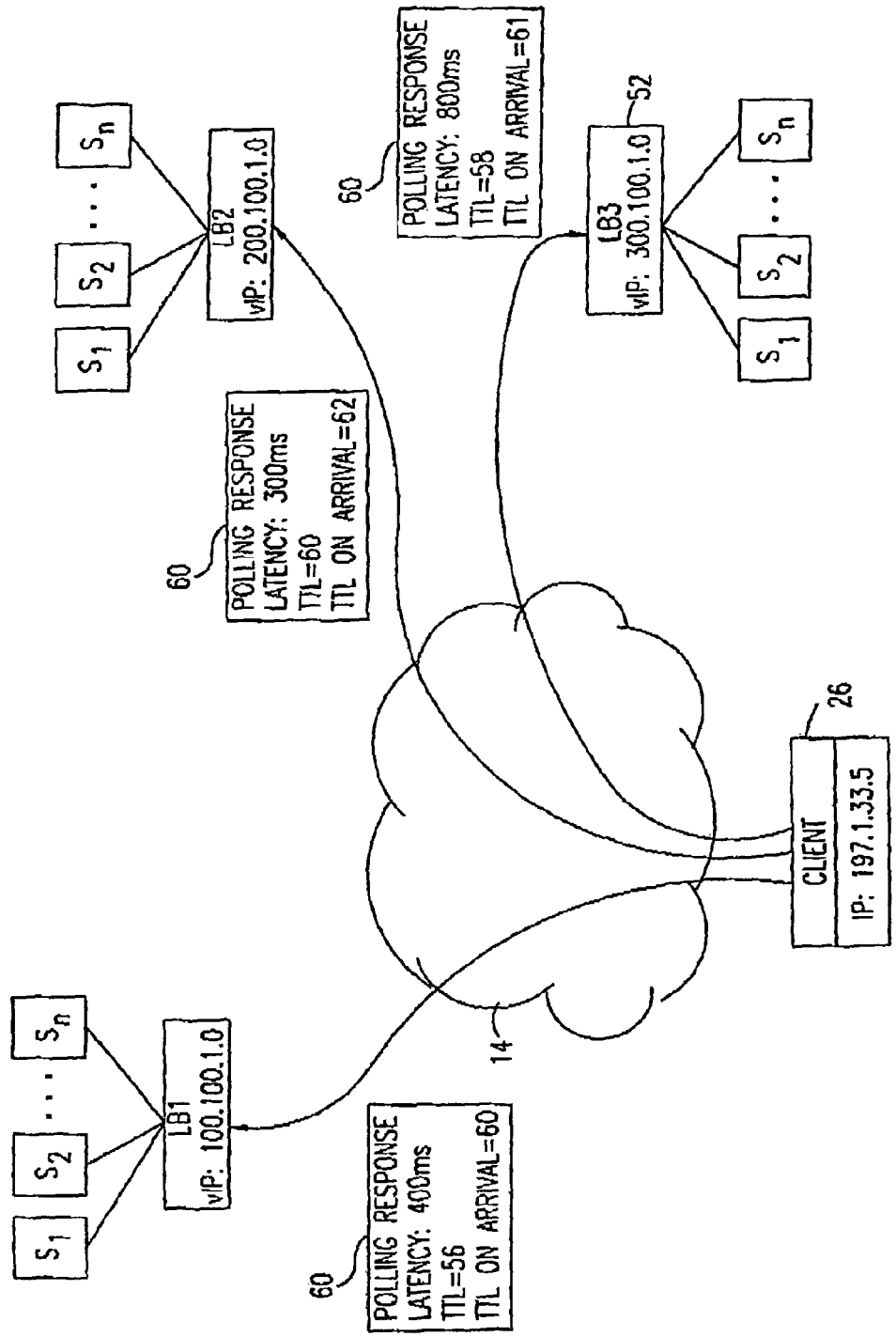

Client 26 is shown in FIG. 2D sending a polling response 60 to the various polling requests. The response 60 may be used to determine the latency of the transmission, as well as the TTL value. LB2 and LB3 then send polling results 62 to LB1, as shown in FIG. 2E. The polling results may then be compared, and LB1, LB2, and LB3 may be ranked, such as by weighting each attribute and determining a total weighted value for each server farm. Polling results may be considered together with server farm capacity and availability, such as may be requested and provided using known load balancing reporting techniques or as described hereinabove with reference to FIGS. 1A and 1B, to determine the server farm site that is "closest" to client 26 and, by extension, the client's subnet, which, in the example shown, is determined to be LB2. For example, the closest site may be that which has the lowest total weighted value for all polling, load, and capacity results. LB1 may then store the closest site to the client/subnet in proximity table 54.

As was described above, a load balancer that receives a request from a client may check proximity table 54 for an entry indicating the subnet corresponding to the subnet of the source IP address of the incoming request. Thus, if a corresponding entry is found in proximity table 54, the request is simply routed to the location having the best network proximity. Although the location having the best network proximity to a particular subnet may have already been determined, the load balancer may nevertheless decide to forward an incoming request to a location that does not have the best network proximity should a load report received from the best location indicate that the location is too busy to receive requests. In addition, the best network proximity to a particular subnet may be periodically predetermined, such as at fixed times or after a predetermined amount of time has elapsed from the time the last determination was made.

As is shown more particularly with reference to FIG. 2F, once the closest site for client 26 has been determined, client 26 may be redirected to the closest site using various methods. If a DNS request is received from client 26, LBI may respond with LB2's address. If an HTTP request is received from client 26, HTTP redirection may be used. Alternatively, regardless of the type of request received from client 26, triangulation as described hereinabove with reference to FIGS. 1A-1C may be used.

The present invention can also be used in a multi-homing environment; i.e., for management of networks that have multiple connections to the Internet through multiple Internet Service Providers (ISPs).

Figure 3A:
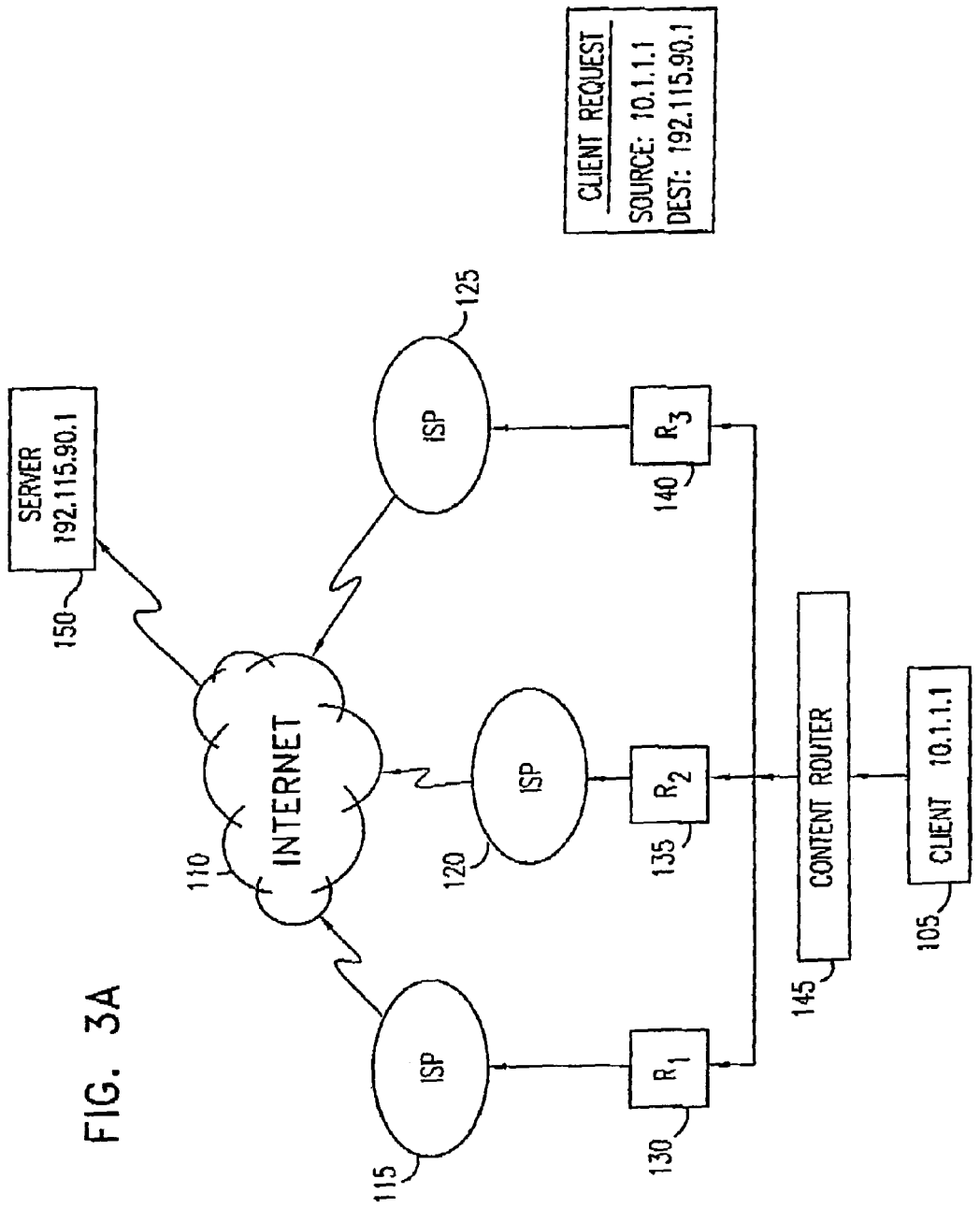
FIGS. 3A-3F, taken together, are simplified pictorial flow illustrations of a preferred embodiment of the present invention for managing and load balancing a multi-homed network architecture whereby a client is connected to the Internet through multiple ISPs.

Reference is now made to FIGS. 3A-3F, which illustrate a preferred embodiment of the present invention for managing and load balancing a multi-homed network architecture whereby a client is connected to the Internet through multiple ISPs. As illustrated in FIG. 3A, a client 105 is connected to the Internet 110 through three ISPs, 115, 120 and 125, each having a respective router 130, 135 and 140 to controls the flow of data packets. The system includes a content router 145, operative in accordance with a preferred embodiment of the present invention, to provide efficient connectivity between client 105 and Internet servers, such as server 150. As illustrated in FIG. 3A, client 105 has an IP address of 10.1.1.1 on a private network, and seeks to connect to server 150 having an IP address of 192.115.90.1.

Figure 3B:
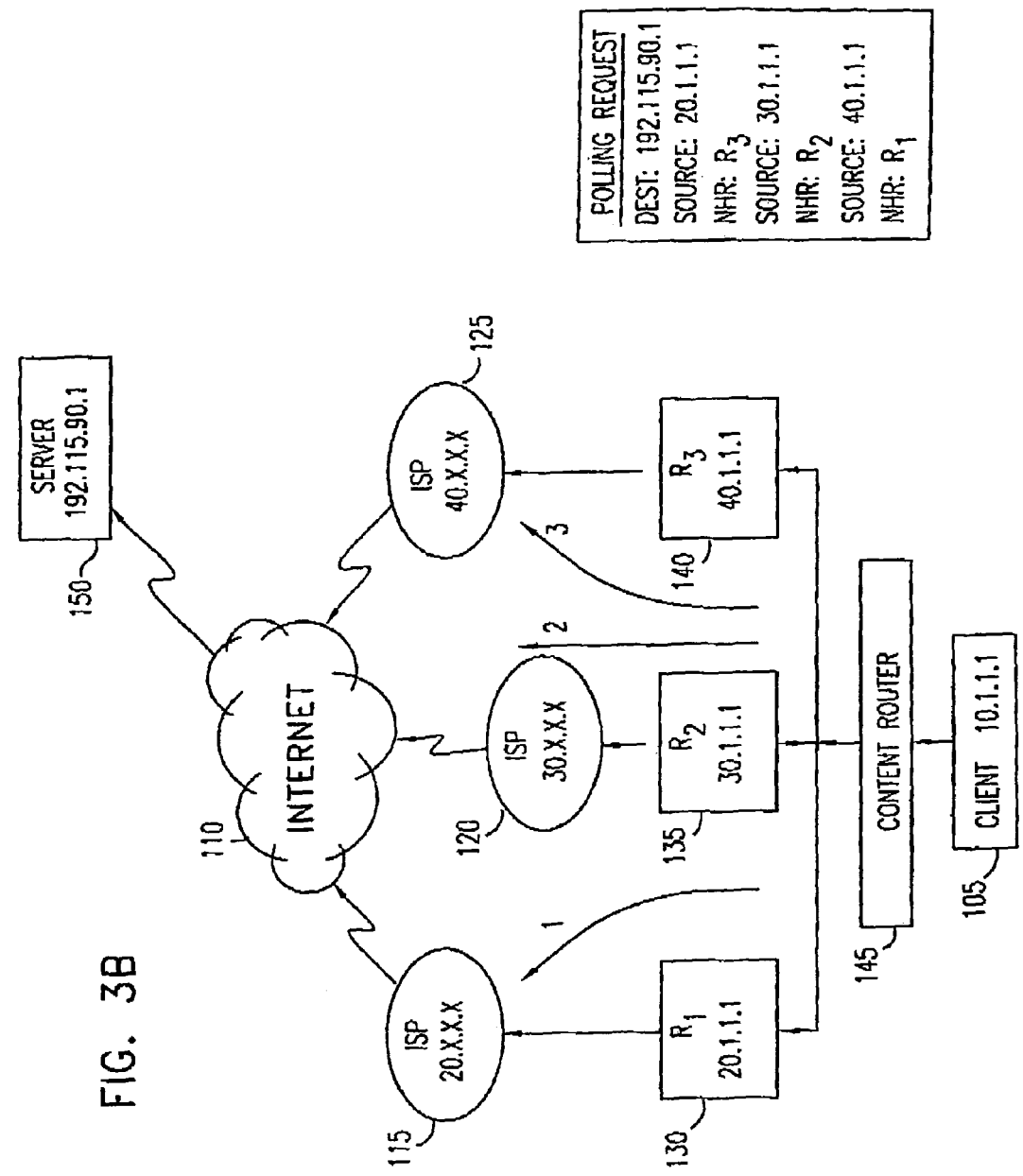

As illustrated in FIG. 3B, ISPs 115, 120 and 125 assign respective IP address ranges to the client network, indicated in FIG. 3B by ranges 20.x.x.x, 30.x.x.x and 40x.x.x. The first time that client 105 connects to server 150, content router 145 preferably sends polling requests through each of routers 130, 135, and 140 in order to determine the proximity of server 150 to client 105. When sending the polling requests, content router 145 assigns respective network addresses 20.1.1.1, 30.1.1.1 and 40.1.1.1 to client 105. Thus three polling requests are sent: one from-each of the sources 20.1.1.1, 30.1.1.1 and 40.1.1.1 to destination 192.115.90.1.

Figure 3C:
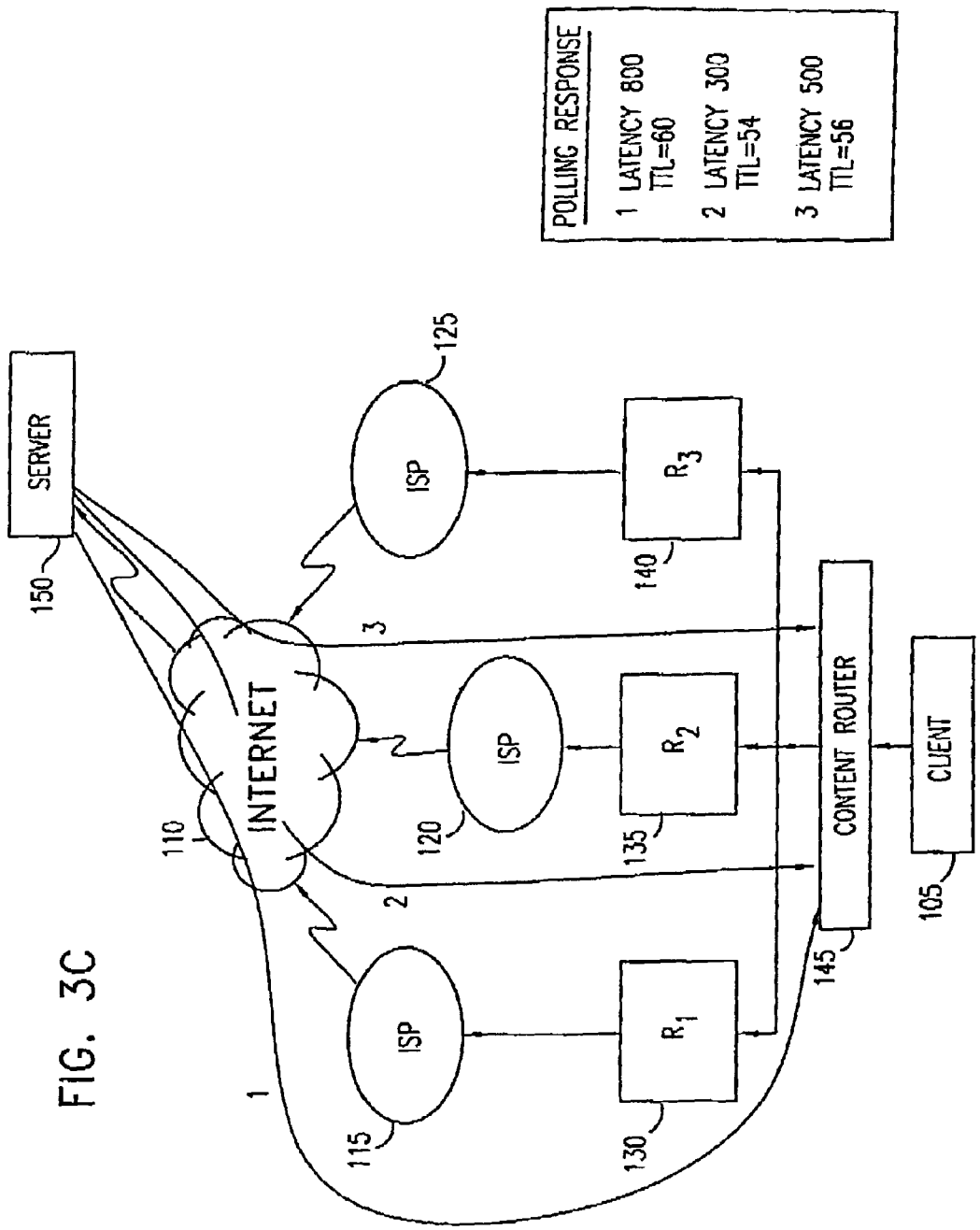

As illustrated in FIG. 3C, server 150 replies to each network address 20.1.1.1, 30.1.1.1 and 40.1.1.1, and the replies are accordingly transmitted through each of the respective ISPs 115, 120 and 125. Each of the replies is measured for latency and number of hops. For example, as illustrated in FIG. 3C, the three respective replies have latency and TTL metrics of 800/60; 300/54; and 500/56.

Figure 3D:
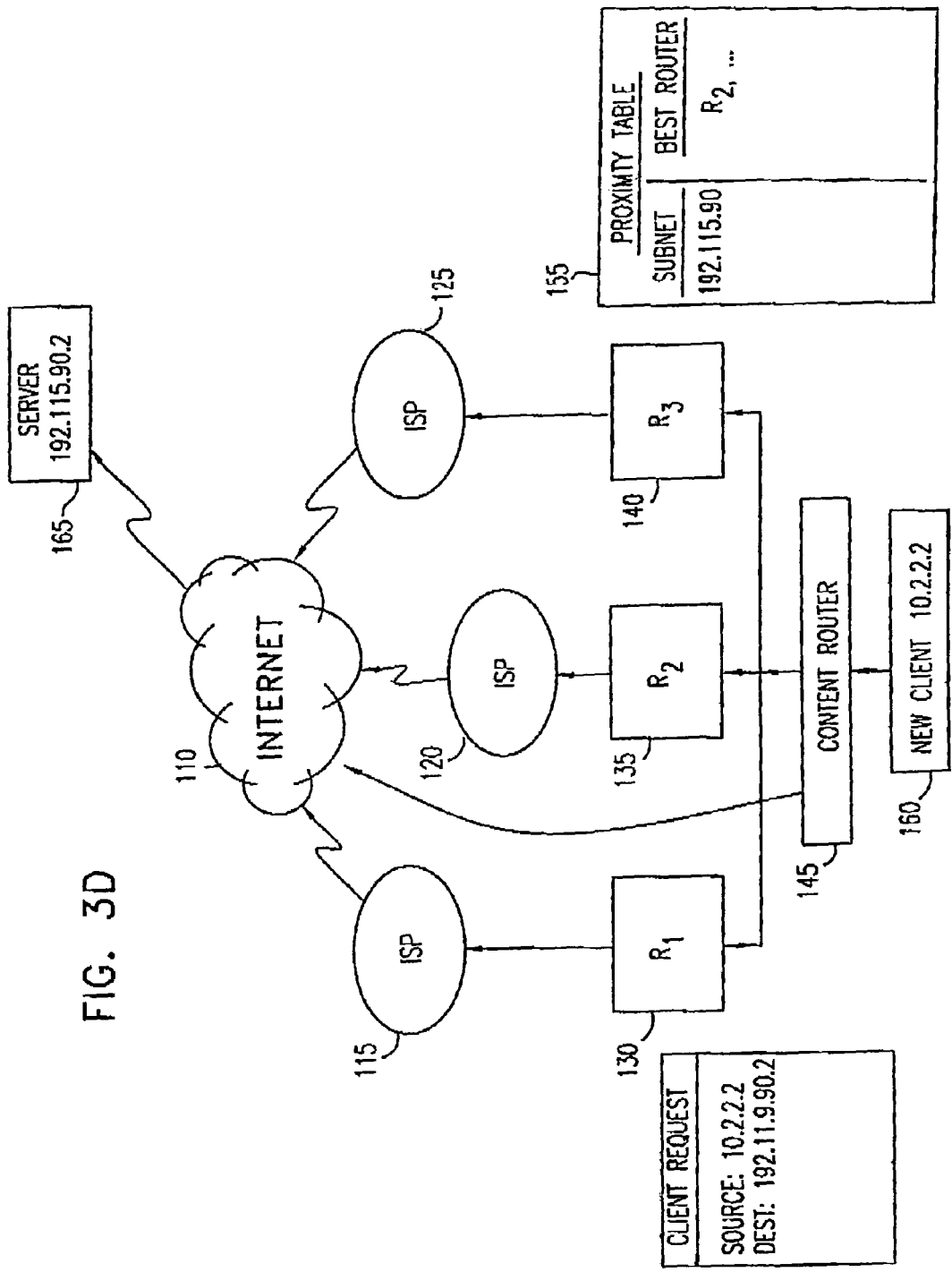

Based on these polling results, content router 145 chooses, for example, router 135 as its first choice for connecting client 105 with server 150. As illustrated in FIG. 3D, proximity results are stored in a proximity table 155. Specifically, proximity table 155 indicates that router 135 is the first choice for connecting content router 145 to any computer residing on subnet 192.115.90. Thus, when a new client 160 with IP address 10.2.2.2 on the private network attempts to connect to a server 165 with IP address 192.115.90.2, through a content router 145, content router 145 determines from proximity table 155 that the best router to use is router 135.

Figure 3E:
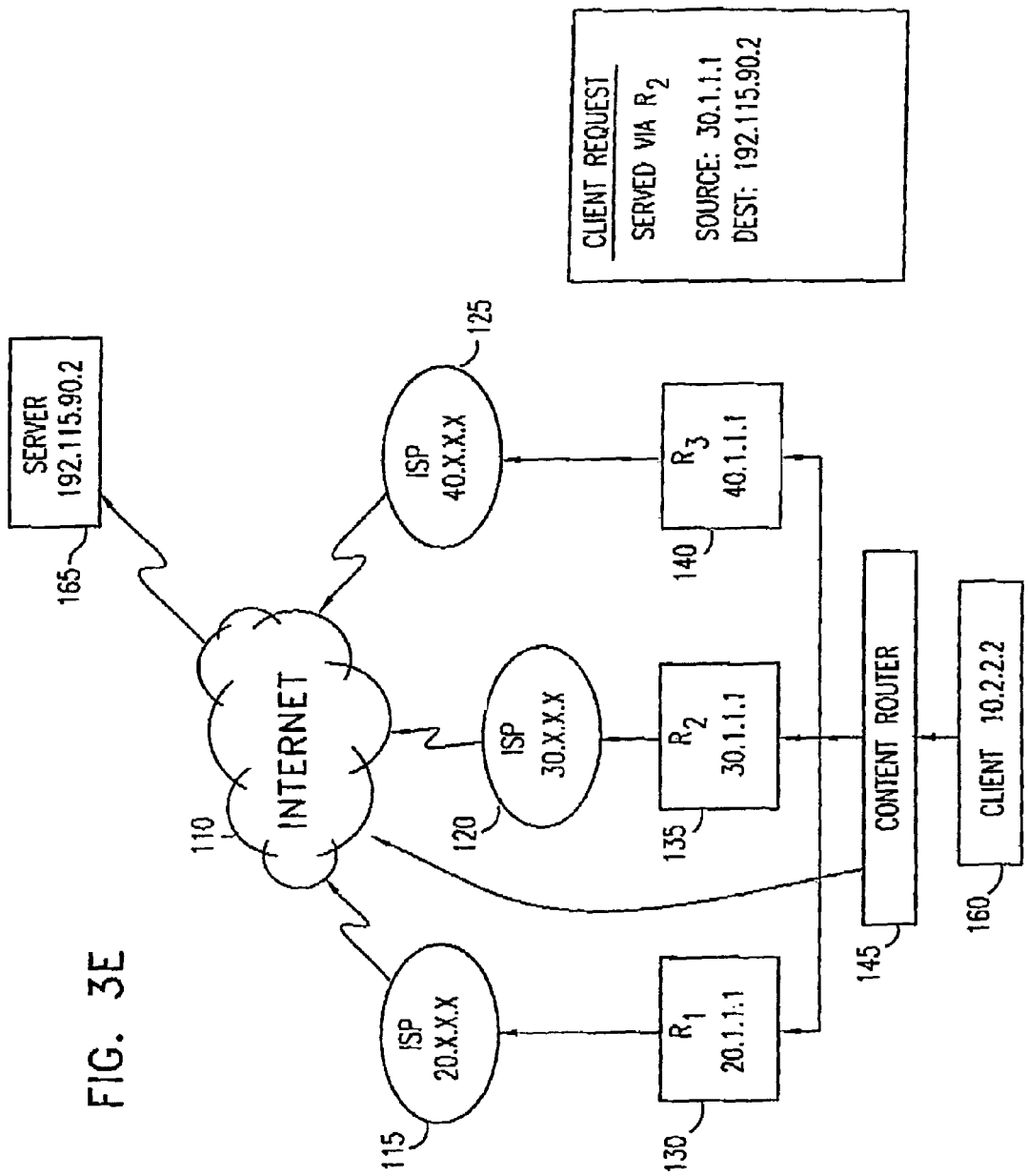

In turn, as illustrated in FIG. 3E, content router 145 sends requests issued from client 160 via router 135, and indicates a source IP address of 30.1.1.1, which is the IP address associated with router 135 from within the range of IP addresses allocated by ISP 120, with each such request.

Figure 3F:
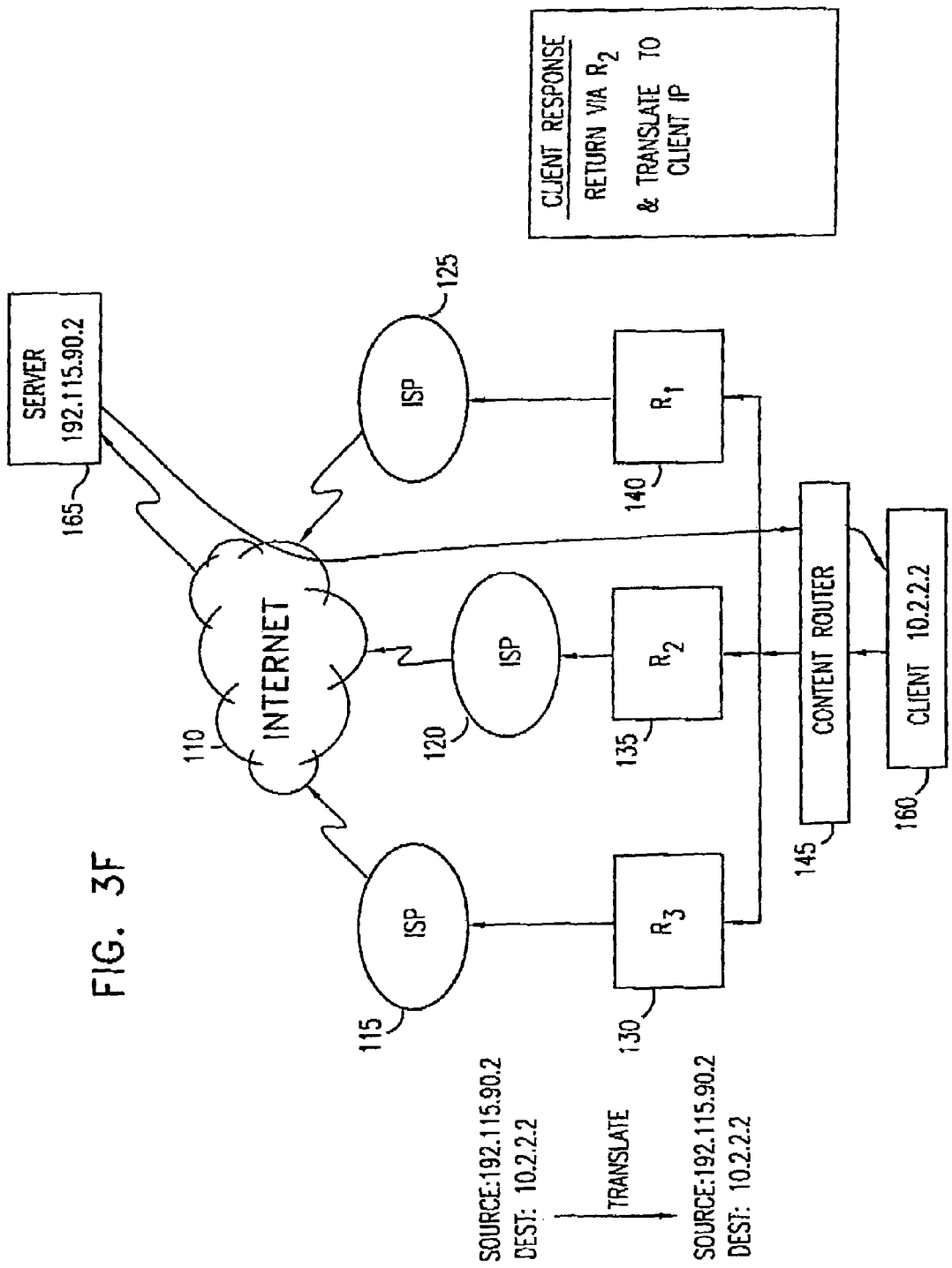

As illustrated in FIG. 3F, this indicator ensures that subsequent responses sent back from server 165 will be addressed to IP address 30.1.1.1 and, accordingly, will be routed through ISP 120. Content router 145 in turn uses network address translation (NAT) data to determine that IP address 30.1.1.1 corresponds to private IP address 10.2.2.2, and transmits the responses from server 165 back to client 160.

Figure 4A:
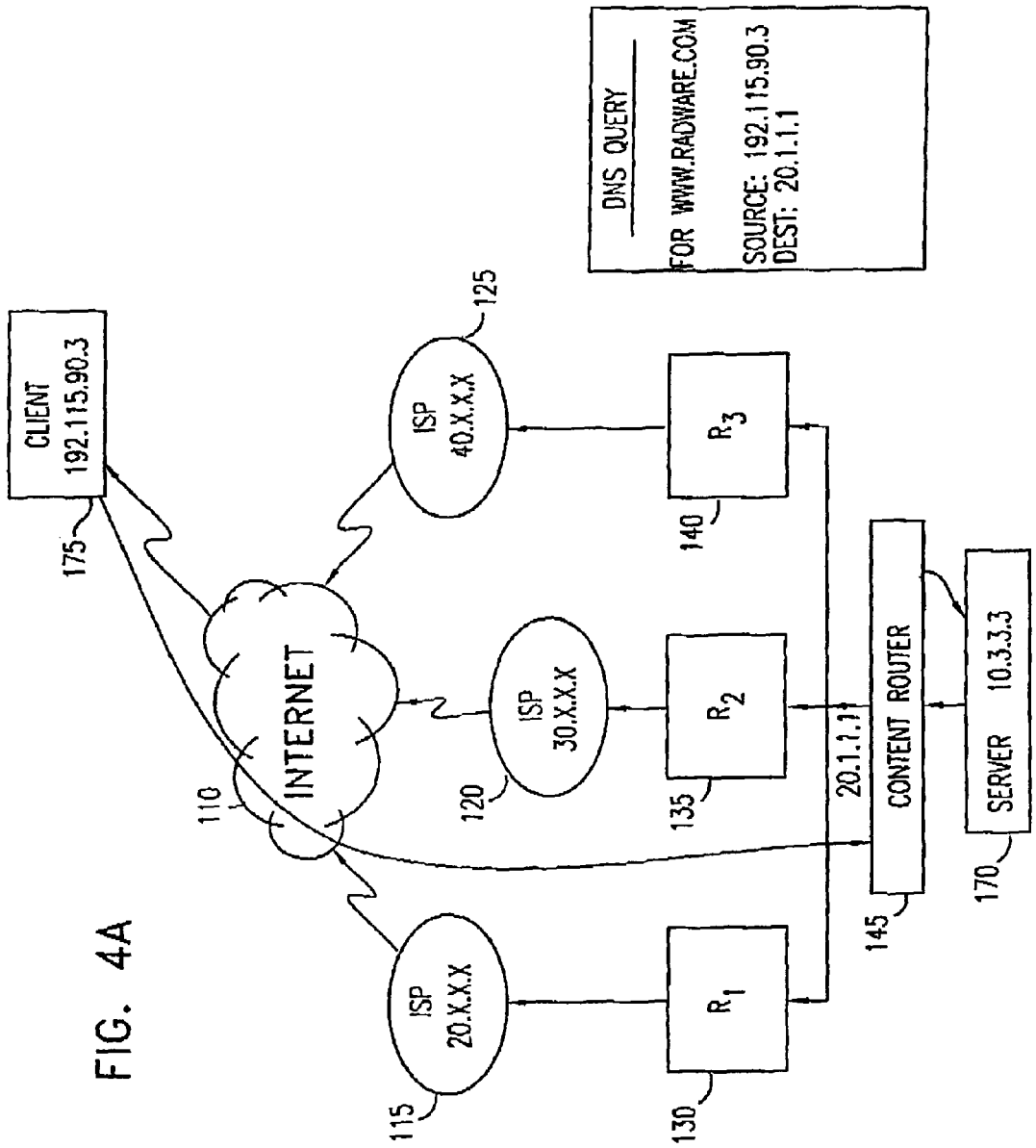
FIGS. 4A and 4B, taken together, are simplified pictorial illustrations of a preferred embodiment of the present invention used to resolve incoming DNS requests for a-multi-homed network architecture.

Reference is now made to FIG. 4A, which illustrates a preferred embodiment of the present invention used to resolve incoming DNS requests for a multi-homed network architecture. Server 170 is assigned IP address 10.3.3.3 within a private multi-homed network, similar to the network illustrated in FIG. 3A. Each of ISPs 115, 120 and 125 assigns a range of IP addresses to the multi-homed network. A DNS request for resolution of a domain name is issued from a client 175 with IP address 192.115.90.3. The DNS request has a source IP address of 192.115.90.3 and a destination IP address of 20.1.1.1. As such, it arrives at content router 145 via router 130.

Figure 4B:
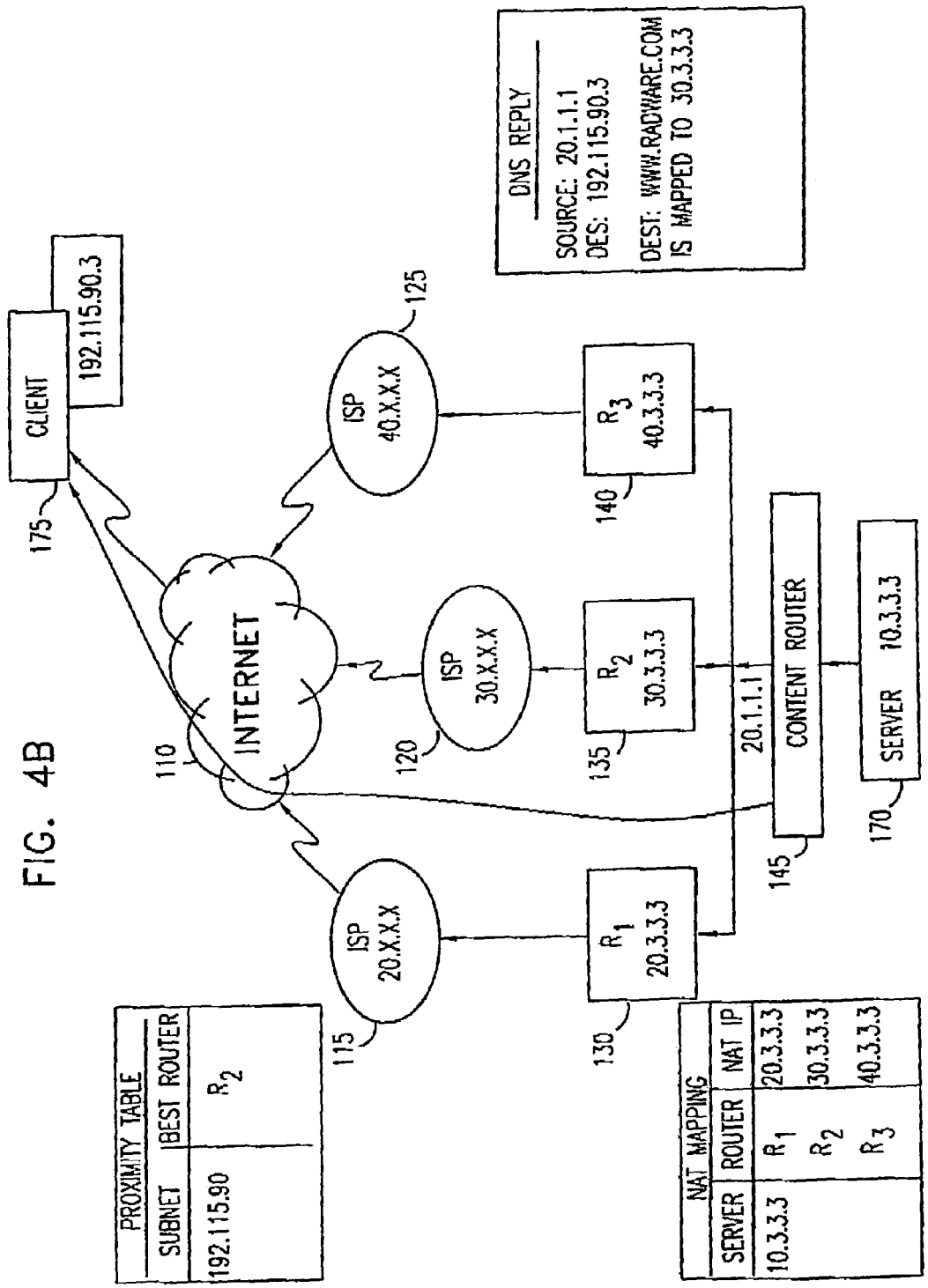

FIG. 4B indicates a NAT mapping table 180, showing that the private IP address 10.3.3.3 for server 170 is translated to IP addresses 20.3.3.3, 30.3.3.3 and 40.3.3.3, respectively, by routers 130, 135 and 140. Content router 145 looks up the subnet entry 192.115.90 in proximity table 155, and identifies router 135 as the first choice for best proximity between server 170 and client 175. In resolving the DNS request, content router 145 accordingly provides 30.3.3.3 as the IP address for server 170. This ensures that requests from client 175 are sent to server 170 with a destination IP address of 30.3.3.3, which in turn ensures that the client requests are transmitted through ISP 120.

It can be seen from FIGS. 3A-3F that the present invention efficiently balances the load among the three ISPs 115, 120, and 125 for outgoing connections. Similarly, it can be seen from FIGS. 4A and 4B that the present invention efficiently balances the load among the three ISPs 115, 120, and 125 for incoming connections. In the event that the router indicated as first choice for the best proximity connection is unavailable or overloaded, the present invention preferably uses a second choice router instead. Thus the present invention ensures that if an ISP service is unavailable, connectivity to the Internet is nevertheless maintained.

Referring back to FIG. 3F, suppose for example that ISP 120 is unavailable, and that content router 145 routes the outgoing client request through ISP 125 instead of through ISP 120. In accordance with a preferred embodiment of the present invention, content router 145 routes the outgoing request through ISP 125 and labels the outgoing request with a source IP address of 40.1.1.1. Had content router 145 used ISP 125 but indicated a source IP address of 30.1.1.1, the response from server 150 would be directed back through ISP 120, and not be able to get through to client 160.

Similarly, referring back to FIG. 4B, suppose for example that ISP 120 is unavailable, and that content router 145 resolves the DNS request with IP address 40.3.3.3 instead of IP address 30.3.3.3. This ensures that client 175 directs its requests through ISP 125, and avoids any blockage at ISP 120.

Figure 5:
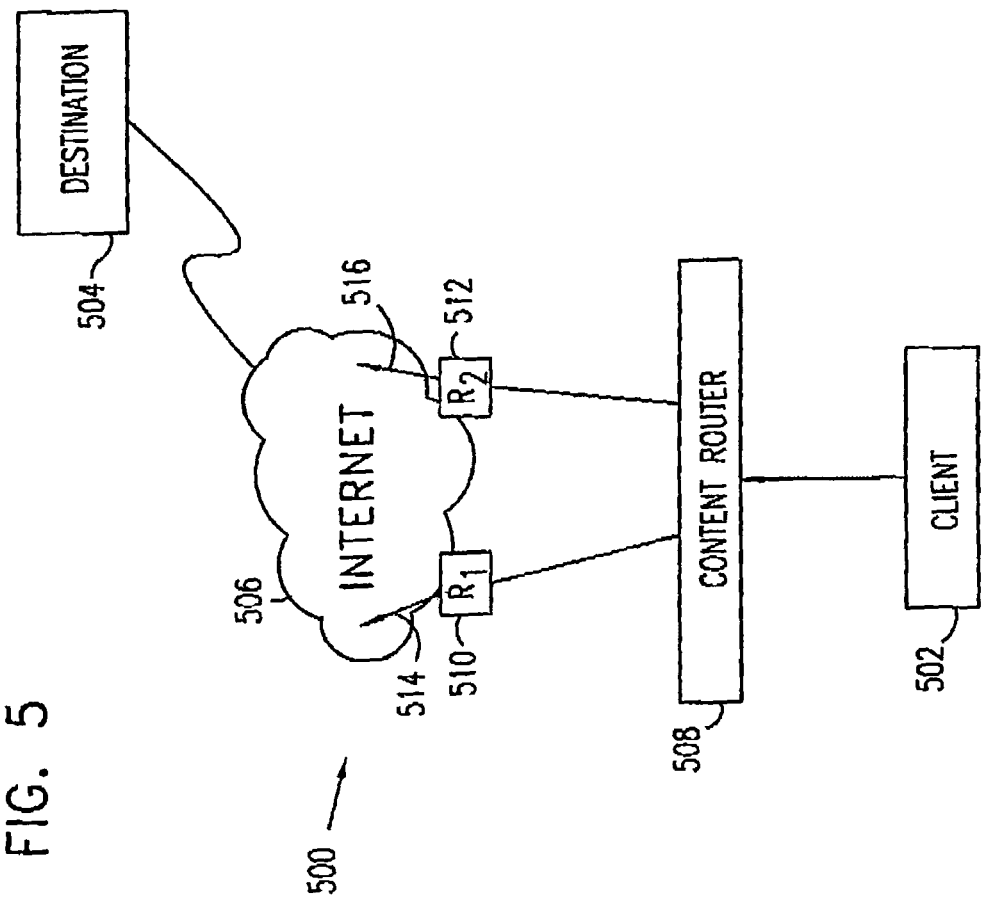
FIG. 5 illustrates a content routing system constructed and operative in accordance with yet another preferred embodiment of the present invention.

Reference is now made to FIG. 5, which illustrates a content routing system 500 constructed and operative in accordance with yet another preferred embodiment of the present invention. The content routing system 500, connects a client 502 to a destination 504 via a network system, such as the Internet network 506, using a content router 508. The content router 508 is connected to the Internet 506 typically via routers, R1 510 and R2 512. The content router 508 presents to the client 502 the most efficient pathway for choosing his connection to the destination 504. The routers 510 and 512 are connected to paths 514 and 516, respectively, and each path possess a path quality factor, Q1 and Q2, respectively.

The path quality factor Qi is defined as:

Path Quality Factor $Qi=Q$(traffic load;packet loss;link pricing)

The path quality factor, for a given path, is typically dependent on the data content of the data packet. Typical path quality weighting factors are shown in Table 1 for the listed data content. It is appreciated that path quality factor is typically checked periodically, by the content router 508, for each Internet path.

It is appreciated that the managing of the routing by the content router 508, typically depends on the following factors: the content type, the number of hops to the destination, the response time of the destination, the availability of the path, the costing of the link and the average packet loss in the link.

In order for the content router 508 to determine the "best" path, a "Decision Parameter Table" is built for each content type. It is appreciated that the content type may vary between the application type and actual content (URL requested, or any other attribute in the packet). The Decision Parameter Table is preferably dependent on the parameters: Data packet content; Hops weighting factor; Packet loss factor and Response time factor. Typical values of these parameters are also given in Table 1.

TABLE 1

| Content Type | Packet Loss, % | Hops, % | Response Time, % | Path Quality, % |
|---|---|---|---|---|
| HTTP | 0 | 20 | 60 | 20 |
| FTP | 30 | 0 | 50 | 20 |
| URL1 | 0 | 30 | 50 | 20 |
| URL2 | 0 | 30 | 50 | 20 |
| File Type 1 | 20 | 20 | 40 | 20 |
| File Type 2 | 20 | 10 | 30 | 40 |
| Telnet | 0 | 0 | 20 | 80 |

In addition to the parameters listed in Table 1, the following additional parameters may also be taken into consideration Hops count factor; Response time factor, Path quality factor; and Packet loss factor.

A Destination Table is built to summarize the following factors: the content type, the number of hops to the destination, the response time of the destination, the availability of the path, and the average packet loss in the link, based on proximity calculations, as previously defined.

Using the relevant data, as typically listed in Table 1, the content router 508 determines a Decision Function $F_{content}$ for each path:

$F_{content}=F$(Hops weighting factor*Hops count factor;
Response weighting factor*Response time factor,
Path quality weighting factor*Path quality factor;
Packet loss weighting factor*Packet loss factor).

It is appreciated that the above parameters, which are used in the calculation of $F_{content}$, are typically normalized for each path.

Based on the Decision Function the content router 508 selects one of the available paths. The data packet is then routed through the selected path. The Decision Function for a particular path is determined by an administrative manager (not shown) and may depend, for example, on the minimum number of hops or on the relevant response time, or on the packet loss, or on the path quality, or any combination of the above parameters, according to the administrative preferences.

Figure 6:
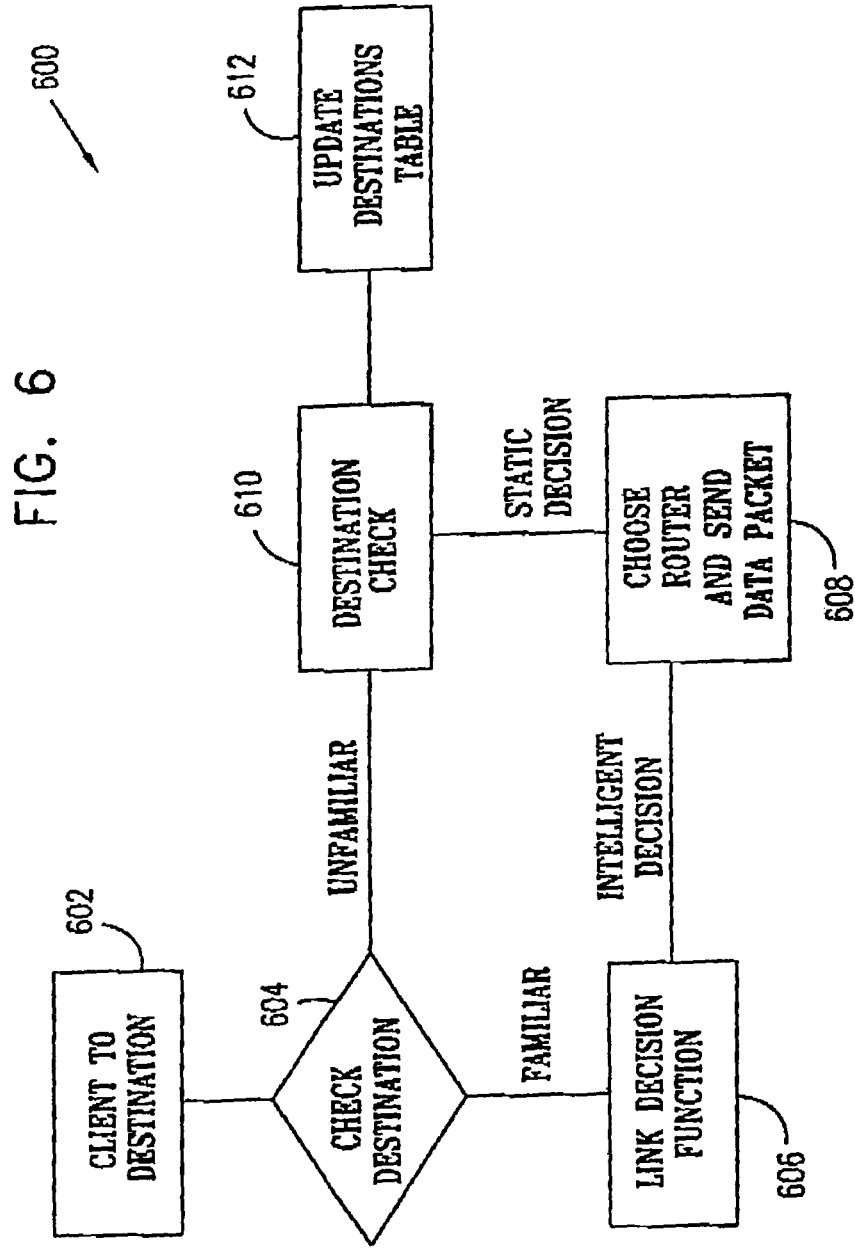
FIG. 6 is a simplified flowchart illustrating the operation of the content router in accordance with another preferred embodiment of the present invention.

The operation of the content router 508 is summarized in the flowchart 600 illustrated in FIG. 6. In the first step 602, the client 502 wishing to send a data packet to the destination 504, sends the data packet (step 602) to the content router 508. The content router 508 preferably first checks (step 604) to determine if the destination 504 is known (familiar) from the Destinations Table (FIG. 7) and that a previous check for the subnet of the destination 504 was already performed. If the destination 504 is familiar, the content router 508 selects a link to the destination 504 using the $F_{content}$ function, taking into account the parameters that were gathered earlier (step 606). The $F_{content}$ function is normalized. The decision made in step 608 is then used by the content router 508 to make the connection with the destination 504 for routing the data packet.

If the destination 504 is unfamiliar, the content router 508 performs a destination check (step 610). The destination check is performed by using the proximity methods, as described hereinabove, by generating actual web traffic towards the destination subnet. This function, as carried out by the content router 508 comprises building a Destination Table (FIG. 7), for each available router and its respective path. The Destination Table may then be used by the content router 508 on the next occasion the client 502 wishes to transfer data packets to the destination 504. Consecutively, the content router 508 chooses the router (step 608) for transferring the data packet to the destination 504. This decision is preferably dependent on the path quality factor, as defined hereinabove.

Thus it may be appreciated that the present invention enables a multi-homed network architecture to realize the full benefits of its redundant route connections by maintaining fault tolerance and by balancing the load among these connections, and preferably using data packet content information in an intelligent decision making process.

It is appreciated that elements of the present invention described hereinabove may be implemented in hardware, software, or any suitable combination thereof using conventional techniques.

It is appreciated that the steps described with reference to FIGS. 1A-1C and 2A-2F need not necessarily be performed in the order shown unless otherwise indicated, and that in fact different implementations of the steps may be employed to yield similar overall results.

It is appreciated, that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited to what has been particularly shown and described hereinabove. Rather, the scope of the present invention is defined only by the claims that follow.

What is claimed is:

1. A method for managing a multi-homed network using a content router connected to a client computer network, comprising:

receiving a request from a client within the client computer network directed to a remote server computer within a remote computer network, wherein the client and the remote server computer are connected through a plurality of data routes, each of the plurality of data routes is connected to a router;

selecting a data route from the plurality of data routes to route the received request to the remote server computer, wherein the selection of the data route is based on a decision function;

translating a source IP address of the client to an IP address corresponding to the selected data route; and routing the received request to the remote server computer over the selected data route.

2. The method of claim 1, further comprising:

receiving a response to the request designating a destination IP address sent from the remote server computer; and performing a network address translation (NAT) of the destination IP address to the IP address of the client on the client computer network.

3. The method of claim 2, further comprising:

routing subsequent requests from the client to the remote server computer over the selected data route, wherein the routing is performed during a predefined period of time.

4. The method of claim 1, wherein each of the plurality of routes is connected to an ISP and each of the plurality of data routes is an ISP link.

5. The method of claim 4, wherein the IP address corresponding to the selected data route is selected from a range of IP addresses associated with the selected data route and its respective ISP link.

6. The method of claim 4, wherein the decision function is a weighted function of at least one of: a current load on each data route of the plurality of data routes, packet losses on each data route of the plurality of data routes, a cost of each data route of the plurality of data routes, a capacity of each of the plurality of data routes, a capacity of an ISP link, and a price of an ISP link.

7. The method of claim 1, wherein the decision function is based on availability of each of the data routes among the plurality of data routes.

8. The method of claim 1, wherein the decision function is based on any one of: a round-robin selection parameter, and a random selection parameter.

9. The method of claim 1, wherein the decision function is a weighted function of at least one of: a current load on each data route of the plurality of data routes, packet losses on each data route of the plurality of data routes, a cost of each data route of the plurality of data routes, and a capacity of each of the plurality of data routes.

10. The method of claim 1, wherein the decision function is a function of a measured proximity between the remote server computer and the client computer network through each of the plurality of data routes.

11. The method of claim 10, wherein the measured proximity includes at least one of: latency, a number of hops, and time to live (TTL).

12. The method of claim 11, wherein each of the latency, the number of hops, and the TTL is measured for at least one of: a roundtrip between the remote server computer and the client computer network, a one-way from the remote server computer to the client computer network, and a one-way from the client computer network to the remote server computer.

13. A non-transitory computer readable medium having stored thereon instructions which, when executed, causes a computer to execute the method of claim 1.

14. A network device configured to manage a multi-homed network, comprising:

a processor; and a memory communicatively connected to the processor, wherein the memory contains instructions that, when executed by the processor, configure the network device to:

receive a request from a client within a client computer network directed to a remote server computer within a remote computer network, wherein the client and the remote server computer are connected through a plurality of data routes, each of the plurality of data routes is connected to a router;

select a data route from the plurality of data routes to route the received request, wherein the selection of the data route is based on a decision function;

translate a source IP address of the client to an IP address corresponding to the selected data route; and route the received request from the client to the remote server computer over the selected data route.

15. The network device of claim 14, further configured to:

receive a response to the request designating a destination IP address sent from the remote server computer; and perform a network address translation (NAT) of the destination IP address to the IP address of the client on the client computer network.

16. The network device of claim 15, further configured to:

route subsequent requests from the client to the destination IP address over the selected data route, wherein the routing is performed during a predefined period of time.

17. The network device of claim 14, wherein each of the plurality of routes is connected to an ISP and each of each of the plurality of data routes is an ISP link.

18. The network device of claim 17, wherein the IP address corresponding to the selected data route is selected from a range of IP addresses associated with the selected data route and its respective ISP link.

19. The network device of claim 14, wherein the decision function is based on availability of each of the data routes among the plurality of data routes.

20. The network device of claim 14, wherein the decision function is based on any one of: a round-robin selection parameter, and a random selection parameter.

21. The network device of claim 14, wherein the decision function is a weighted function of at least one of: a current load on each data route of the plurality of data routes, packet losses on each data route of the plurality of data routes, a cost of each data route of the plurality of data routes, a capacity of each of the plurality of data route, a capacity of an ISP line, and a price of an ISP link.

22. The network device of claim 14, wherein the decision function is a function of a measured proximity between the remote server computer and the client computer network through each of the plurality of data routes.

23. The network device of claim 22, wherein the measured proximity includes at least one of: latency, a number of hops, and time to live (TTL).

24. The network device of claim 23, wherein each of the latency, the number of hops, and the TTL is measured for at least one of: a roundtrip between the remote server computer and the client computer network, a one-way from the remote server computer to the client computer network, and a one-way from the client computer network to the remote server computer.

* * * * *